United States Patent
Yuan et al.

(10) Patent No.: US 12,058,069 B2
(45) Date of Patent: Aug. 6, 2024

(54) TRAINING SEQUENCE TRANSMISSION METHOD AND APPARATUS

(71) Applicant: HUAWEI TECHNOLOGIES CO., LTD., Guangdong (CN)

(72) Inventors: Fangchao Yuan, Nanjing (CN); Bo Yang, Nanjing (CN); Yinliang Hu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 338 days.

(21) Appl. No.: 17/489,650

(22) Filed: Sep. 29, 2021

(65) Prior Publication Data

US 2022/0045815 A1 Feb. 10, 2022

Related U.S. Application Data

(63) Continuation of application No. PCT/CN2020/083350, filed on Apr. 3, 2020.

(30) Foreign Application Priority Data

Apr. 3, 2019 (CN) .......................... 201910267279.2

(51) Int. Cl.
*H04L 5/00* (2006.01)
*H04L 25/03* (2006.01)

(52) U.S. Cl.
CPC .......... *H04L 5/0048* (2013.01); *H04L 5/0053* (2013.01); *H04L 25/03006* (2013.01);
(Continued)

(58) Field of Classification Search
None
See application file for complete search history.

(56) References Cited

U.S. PATENT DOCUMENTS 10,715,995 B2 * 7/2020 Segev ................... H04J 3/0667
2016/0295581 A1 10/2016 Ghosh et al.
(Continued)

FOREIGN PATENT DOCUMENTS

CN 106341828 A 1/2017
CN 106658741 A 5/2017
(Continued)

OTHER PUBLICATIONS

CableLabs et al.,"Considerations on LAA-LTE UL Transmissions without LBT", 3GPP TSG RAN WG1 Meeting #83 , Anaheim, CA, Nov. 15-22, 2015, R1-156983,total:2pages.
(Continued)

*Primary Examiner* — Kenny S Lin

(57) ABSTRACT

This application provides a training sequence transmission method and apparatus. The method includes: A first AP broadcasts a trigger frame, where the trigger frame indicates a time sequence of separately sending channel sounding frames by N STAs, and N is an integer greater than 1. The first AP receives the channel sounding frames sequentially sent by the N STAs, where one channel sounding frame includes one or more training sequences. In this solution, only one trigger frame needs to be sent, so that the N STAs can be triggered to separately report channel sounding frames to M+1 APs. However, in the conventional technology, each AP needs to send one channel training request to each STA, that is, N×(M+1) channel training requests are sent in total, to trigger each STA to report a training sequence. Therefore, this solution can significantly reduce signaling overheads.

19 Claims, 13 Drawing Sheets

(52) U.S. Cl.
CPC ............... *H04L 2025/0377* (2013.01); *H04L 2025/03815* (2013.01)

(56) References Cited

U.S. PATENT DOCUMENTS

| | | | |
|---|---|---|---|
| 2017/0208618 A1* | 7/2017 | Ding | H04W 76/14 |
| 2018/0011179 A1* | 1/2018 | Zhang | G01S 5/0205 |
| 2019/0021106 A1 | 1/2019 | Oteri et al. | |
| 2019/0036739 A1* | 1/2019 | Lindskog | H04L 25/0224 |
| 2019/0132294 A1* | 5/2019 | Li | H04W 12/06 |
| 2019/0140728 A1* | 5/2019 | Moon | H04B 7/0617 |
| 2020/0029236 A1* | 1/2020 | Segev | H04L 5/0051 |
| 2022/0014237 A1* | 1/2022 | Lopez-Perez | H04L 25/0226 |
| 2022/0038140 A1* | 2/2022 | Lopez-Perez | H04B 7/0617 |

FOREIGN PATENT DOCUMENTS

| | | | | |
|---|---|---|---|---|
| CN | 107027145 A | | 8/2017 | |
| EP | 3975444 A1 | * | 3/2022 | ........... H04B 7/0626 |
| WO | 2018132139 A1 | | 7/2018 | |
| WO | 2018169799 A1 | | 9/2018 | |

OTHER PUBLICATIONS

IEEE et al.,"Part 11: Wireless LAN Medium Access Control (MAC) and Physical Layer (PHY) Specifications Amendment 4: Enhancements for Very High Throughput for Operation in Bands below 6 Ghz",IEEE Std 802.11ac-2013, total:425pages.

Der-Jiunn Deng et al.,"IEEE 802.11ax: Highly Efficient WLANs for Intelligent Information Infrastructure",Nov. 13, 2017, total:8pages.

IEEE et al.,"Part 11:Wireless LAN Medium Access Control (MAC) and Physical Layer(PHY) Specifications Amendment 5:Enhancements for Higher Throughput",Oct. 29, 2009, IEEE Std 802.11 nT""-2009,total:536pages.

Boris Bellalta et al.,"IEEE 802.11ax: High-Efficiency WLANs",IEEE 802.11ax,total:9pages.

Michelle X. Gong et al, Training Protocols for Multi-User MIMO Wireless LANs, 2010 IEEE 21st International Symposium on Personal Indoor and Mobile Radio Communications, Sep. 26, 2010, total 6 pages.

Ryan E. Guerra et al, Opportunistic Channel Estimation for Implicit 802.11af MU-MIMO, 2016 28th International Teletraffic Congress—The First International Conference in Networking Science and Practice, Sep. 12, 2016, total 9 pages.

Extended European Search Report issued in EP20785323.5, dated Mar. 30, 2022, 10 pages.

* cited by examiner

| B0 B3 | B4 B15 | B16 | B17 B18 | B19 B20 B21 | B22 B23 | B24 B25 |
|---|---|---|---|---|---|---|
| Trigger type (Trigger Type) | Uplink length | More trigger frames | Carrier sense | Bandwidth | Guard interval and LTF type | Mutil-user MIMO LTF mode | Number of HE-LTFs |
| 4 | 12 | 1 | 1 | 2 | 2 | 1 | 3 |

Bits (bits)

| B26 | B27 | B28 B33 | B34 B36 | B37 B52 | B53 | B54 B62 | B63 |
|---|---|---|---|---|---|---|---|
| Space time coding | LDPC extra symbol segment | AP transmit power | Uplink packet extensive sub-field | Uplink spatial multiplexing | Doppler | HE-SIG-A2 reserved | Reserved | Trigger dependent common info |
| 1 | 1 | 6 | 3 | 16 | 1 | 9 | 1 | Variable (variable) |

Bits (bits)

FIG. 8

| Association identifier AID 12 | Resource unit allocation | Error correction code type | Uplink rate selection | Dual-carrier modulation | Spatial stream allocation | Uplink target received signal strength indicator | Reserved | Trigger independent user info |
|---|---|---|---|---|---|---|---|---|
| B0   B11 | B12   B19 | B20 | B21   B24 | B25 | B26   B31 | B32   B38 | B39 | |

Bits (bits): 12, 8, 1, 4, 1, 6, 7, 1, Variable (variable)

| Starting spatial stream | Number of spatial streams |
|---|---|
| B26   B28 | B29   B31 |

Bits (bits): 3, 3

FIG. 9

TRAINING SEQUENCE TRANSMISSION METHOD AND APPARATUS

CROSS-REFERENCE TO RELATED APPLICATIONS

This application is a continuation of International Application No. PCT/CN2020/083350, filed on Apr. 3, 2020, which claims priority to Chinese Patent Application No. 201910267279.2, filed on Apr. 3, 2019. The disclosures of the aforementioned applications are hereby incorporated by reference in their entireties.

TECHNICAL FIELD

This application relates to the field of mobile communication technologies, and in particular, to a training sequence transmission method and apparatus.

BACKGROUND

The 802.11n standard, the 802.11ac standard, and the 802.11ax standard of the Institute of Electrical and Electronics Engineers (IEEE) all introduce a multiple-input multiple-output (MIMO) technology at a physical layer, and spatial multiplexing is used to multiply a system capacity and greatly improve performance. The MIMO technology means that a plurality of antennas are simultaneously configured at a transmit end (for example, an access point (AP)) and a receive end (for example, a station (STA)), and signals are sent and received by using different antennas, so that the system channel capacity can be multiplied by using a spatial multiplexing gain without increasing a frequency resource and antenna transmit power. A MIMO system can effectively suppress or cancel co-channel interference by using a precoding technology. Theoretically, if there are N antennas at the transmit end, electromagnetic signals that do not interfere with each other can be transmitted to N receive ends at the same time, and signals of the plurality of antennas are superimposed, to generate optimal spatial joint diversity and perform interference cancellation processing.

A prerequisite for implementing MIMO precoding is that the transmit end has a training sequence from the AP to the STA. Channel estimation is performed between the AP and the STA based on the training sequence, so that orthogonal precoding generated based on the channel estimation can enable user flows to be orthogonal and not interfere with each other.

FIG. 3 is a schematic diagram of a training sequence transmission method in the conventional technology. In this solution, an AP sends a channel training request (TTRQ), and requires a STA to send a null data packet (NDP) frame including a training sequence of an uplink channel based on reciprocity between the uplink channel and a downlink channel (for example, the uplink channel is equivalent to the downlink channel). The AP estimates the uplink channel based on the training sequence of the uplink channel in the received NDP frame, to replace channel estimation of the downlink channel between the AP and the STA. In this solution, the AP sends a TRQ to a STA-1. After receiving the TRQ, the STA-1 waits for one short interframe space (Short Interframe Space, SIFS) and sends a training sequence to the AP. Then, the AP may perform estimation on a channel between the AP and the STA-1 based on the training sequence. Then, after waiting for one SIFS, the AP sends a TRQ to a STA-2. After receiving the TRQ, the STA-2 waits for one SIFS and then sends a training sequence to the AP. Then, the AP may perform estimation on a channel between the AP and the STA-2 based on the training sequence. Then, the foregoing process is repeated until channel estimation between the AP and N STAs are obtained. Similarly, if there are a plurality of APs, each AP may repeat operations of the foregoing AP to obtain channel state information between each AP and each STA through sounding.

The foregoing solution has the following disadvantages: In this solution, signaling exchange is frequent; air interface overheads are large; and as a quantity of APs or a quantity of STAs increases, overheads greatly increase.

SUMMARY

This application provides a training sequence transmission method and apparatus, to reduce overheads of transmitting a training sequence in a channel estimation process.

According to a first aspect, this application provides a training sequence transmission method. The method includes: A first access point AP broadcasts a trigger frame, where the trigger frame indicates a time sequence of separately sending channel sounding frames by N stations STAs, and N is an integer greater than 1. The first AP receives the channel sounding frames sequentially sent by the N STAs, where one channel sounding frame includes one or more training sequences. Based on this solution, only one trigger frame needs to be sent, so that the N STAs can be triggered to separately report the channel sounding frames to the first AP. However, in the conventional technology, an AP needs to send one channel training request to each STA, that is, N channel training requests are sent in total, to trigger each STA to report a training sequence. Therefore, this solution can significantly reduce signaling overheads.

In a possible implementation, that a first AP broadcasts a trigger frame includes: The first AP broadcasts the trigger frame to the N STAs and M second APs, where the trigger frame further indicates whether the M second APs are ready to receive the channel sounding frames sequentially sent by the N STAs, and M is a positive integer.

In a possible implementation, before the first AP broadcasts the trigger frame to the N STAs and the M second APs, the first AP separately sends indication information to the M second APs, where the indication information is used to indicate to follow an indication of the trigger frame of the first AP.

In a possible implementation, the first AP receives notification information from a central controller, where the notification information includes identification information of the N STAs, and the notification information is used to indicate to perform channel sounding on the N STAs.

In a possible implementation, the notification information further includes antenna capability information separately corresponding to the N STAs, and antenna capability information of one STA is used to determine a quantity of training sequences corresponding to the STA.

In a possible implementation, the first AP determines to perform channel sounding on the N STAs.

In a possible implementation, the trigger frame includes a quantity of training sequences corresponding to each of the N STAs, and a quantity of training sequences included in the channel sounding frame is specified by the trigger frame.

In a possible implementation, a frame body of the trigger frame includes first information, and the first information is used to indicate information about the quantity of training sequences corresponding to each of the N STAs and information about occupied bits of the quantity of training sequences corresponding to each of the N STAs.

In a possible implementation, the first information indicates that the N STAs correspond to a same quantity of training sequences and the quantity occupies a first bit; or the first information indicates that a quantity of training sequences corresponding to information about a first bit is ignored, the quantity of training sequences corresponding to each of the N STAs occupies a second bit, the second bit includes N sub-bits, and one sub-bit indicates a quantity of training sequences corresponding to one STA.

In a possible implementation, a quantity of training sequences included in the channel sounding frames is determined by the N STAs separately based on the antenna capability information of the N STAs.

In a possible implementation, the trigger frame includes time points at which the N STAs separately send the channel sounding frames.

In a possible implementation, the first AP determines a second time point at which a first channel sounding frame is received, where the first channel sounding frame is any channel sounding frame in the channel sounding frames separately sent by the N STAs. The first AP determines a first time point closest to the second time point in the time points at which the N STAs separately send the channel sounding frames. The first AP determines that a STA corresponding to the first time point is a STA that sends the first channel sounding frame.

In a possible implementation, that the first AP receives the channel sounding frames sequentially sent by the N STAs includes: The first AP receives, based on the time sequence of separately sending the channel sounding frames by the N STAs, the channel sounding frames sequentially sent by the N STAs.

In a possible implementation, that the first AP receives, based on the time sequence of separately sending the channel sounding frames by the N STAs, the channel sounding frames sequentially sent by the N STAs includes: The first AP determines, based on the time sequence of separately sending the channel sounding frames by the N STAs, the time points at which the N STAs separately send the channel sounding frames. For any channel sounding frame in the N channel sounding frames separately sent by the N STAs, the first AP determines a second time point at which the channel sounding frame is received, and determines a first time point closest to the second time point in the time points at which the N STAs separately send the channel sounding frames; determines that a STA corresponding to the first time point is a STA corresponding to the channel sounding frame; and obtains a quantity of training sequences from the STA corresponding to the channel sounding frame, and uses the quantity as a quantity of training sequences corresponding to the STA.

In a possible implementation, the channel sounding frames separately sent by the N STAs separately include sequence information, and the sequence information indicates a sending sequence of one channel sounding frame in the N channel sounding frames sent by the N STAs. That the first AP receives, based on the time sequence of separately sending the channel sounding frames by the N STAs, the channel sounding frames sequentially sent by the N STAs includes: For any channel sounding frame in the N channel sounding frames separately sent by the N STAs, the first AP determines, based on sequence information of the channel sounding frame and the time sequence of separately sending the channel sounding frames by the N STAs, STA information corresponding to the sequence information in the trigger frame, determines that a STA indicated by the STA information is a STA corresponding to the channel sounding frame, obtains a quantity of training sequences from the STA corresponding to the channel sounding frame, and uses the quantity as a quantity of training sequences corresponding to the STA.

According to a second aspect, this application provides a training sequence transmission method. The method includes: Second AP receive a trigger frame broadcast by a first AP, where the trigger frame indicates a time sequence of separately sending channel sounding frames by N STAs, and N is an integer greater than 1. The second AP receive the channel sounding frames sequentially sent by the N STAs, where one channel sounding frame includes one or more training sequences. In this solution, only one trigger frame needs to be sent, so that the N STAs can be triggered to separately report channel sounding frames to M+1 APs. However, in the conventional technology, each AP needs to send one TRQ to each STA, that is, N×(M+1) TRQs are sent in total, to trigger each STA to report a training sequence. Therefore, this solution can significantly reduce signaling overheads.

In a possible implementation, before the second AP receive the trigger frame broadcast by the first AP, the second AP receive indication information from a central controller or the first AP, where the indication information is used to indicate to follow an indication of the trigger frame of the first AP.

In a possible implementation, the trigger frame includes a quantity of training sequences corresponding to each of the N STAs, and a quantity of training sequences included in the channel sounding frame is specified by the trigger frame.

In a possible implementation, a frame body of the trigger frame includes first information, and the first information is used to indicate information about the quantity of training sequences corresponding to each of the N STAs and information about occupied bits of the quantity of training sequences corresponding to each of the N STAs.

In a possible implementation, the first information indicates that the N STAs correspond to a same quantity of training sequences and the quantity occupies a first bit; or the first information indicates that a quantity of training sequences corresponding to information about a first bit is ignored, the quantity of training sequences corresponding to each of the N STAs occupies a second bit, the second bit includes N sub-bits, and one sub-bit indicates a quantity of training sequences corresponding to one STA.

In a possible implementation, a quantity of training sequences included in the channel sounding frames is determined by the N STAs separately based on antenna capability information of the N STAs.

In a possible implementation, the trigger frame is further used to indicate that the second AP are ready to receive the channel sounding frames sequentially sent by the N STAs.

In a possible implementation, the trigger frame includes identifier of the second AP. If the second AP determine that the trigger frame includes the identifier of the second AP, the second AP determine to receive the channel sounding frames sequentially sent by the N STAs.

In a possible implementation, the trigger frame further includes time points at which the N STAs separately send the channel sounding frames.

In a possible implementation, the second AP determine a second time point at which a first channel sounding frame is received, where the first channel sounding frame is any channel sounding frame in the channel sounding frames separately sent by the N STAs. The second AP determine a first time point closest to the second time point in the time points at which the N STAs separately send the channel sounding frames. The second AP determine that a STA corresponding to the first time point is a STA that sends the first channel sounding frame.

In a possible implementation, that the second AP receive the channel sounding frames sequentially sent by the N STAs includes: The second AP receive, based on the time sequence of separately sending the channel sounding frames by the N STAs, the channel sounding frames sequentially sent by the N STAs.

In a possible implementation, that the second AP receive, based on the time sequence of separately sending the channel sounding frames by the N STAs, the channel sounding frames sequentially sent by the N STAs includes: The second AP determine, based on the time sequence of separately sending the channel sounding frames by the N STAs, the time points at which the N STAs separately send the channel sounding frames. For any channel sounding frame in the N channel sounding frames separately sent by the N STAs, the second AP determine a second time point at which the channel sounding frame is received, and determine a first time closest to the second time point in the time points at which the N STAs separately send the channel sounding frames; determine that a STA corresponding to the first time point is a STA corresponding to the channel sounding frame; and obtain a quantity of training sequences from the STA corresponding to the channel sounding frame, and use the quantity as a quantity of training sequences corresponding to the STA.

In a possible implementation, the channel sounding frames separately sent by the N STAs separately include sequence information, and the sequence information indicates a sending sequence of one channel sounding frame in the N channel sounding frames sent by the N STAs.

That the second AP receive, based on the time sequence of separately sending the channel sounding frames by the N STAs, the channel sounding frames sequentially sent by the N STAs includes: For any channel sounding frame in the N channel sounding frames separately sent by the N STAs, the second AP determine, based on sequence information of the channel sounding frame and the time sequence of separately sending the channel sounding frames by the N STAs, STA information corresponding to the sequence information in the trigger frame; determine that a STA indicated by the STA information is a STA corresponding to the channel sounding frame; and obtain a quantity of training sequences from the STA corresponding to the channel sounding frame, and use the quantity as a quantity of training sequences corresponding to the STA.

According to a third aspect, this application provides a training sequence transmission method. The method includes: A first STA receives a trigger frame broadcast by a first AP, where the trigger frame indicates a time sequence of separately sending channel sounding frames by N STAs, the N STAs include the first STA, and N is an integer greater than 1. The first STA constructs a first channel sounding frame based on a quantity of training sequences corresponding to the first STA, where the first channel sounding frame includes one or more training sequences. The first STA determines a first time point for sending the first channel sounding frame. The first STA sends the first channel sounding frame at the first time point. Based on this solution, only one trigger frame needs to be sent, so that the N STAs can be triggered to separately report the channel sounding frames. However, in the conventional technology, an AP needs to send one channel training request to each STA, that is, N channel training requests are sent in total, to trigger each STA to report a training sequence. Therefore, this solution can significantly reduce signaling overheads.

In a possible implementation, that the first STA determines a first time point for sending the first channel sounding frame includes: The first STA determines a second STA based on the time sequence of separately sending the channel sounding frames by the N STAs, where a time sequence of sending a channel sounding frame by the second STA is earlier than a time sequence of sending a channel sounding frame by the first STA. The first STA determines, based on duration in which the second STA sends the channel sounding frame, the first time point for sending the first channel sounding frame.

In a possible implementation, the first STA determines, based on a quantity of training sequences corresponding to the second STA, the duration in which the second STA sends the channel sounding frame.

In a possible implementation, the trigger frame includes time points at which the N STAs separately send the channel sounding frames. That the first STA determines a first time point for sending the first channel sounding frame includes: The first STA obtains the first time point for sending the first channel sounding frame from the trigger frame In a possible implementation, the trigger frame includes a quantity of training sequences corresponding to each of the N STAs. The first STA obtains the quantity of training sequences corresponding to the first STA from the trigger frame.

In a possible implementation, a frame body of the trigger frame includes first information, and the first information is used to indicate information about the quantity of training sequences corresponding to each of the N STAs and information about occupied bits of the quantity of training sequences corresponding to each of the N STAs.

In a possible implementation, the first information indicates that the N STAs correspond to a same quantity of training sequences and the quantity occupies a first bit; or the first information indicates that a quantity of training sequences corresponding to information about a first bit is ignored, the quantity of training sequences corresponding to each of the N STAs occupies a second bit, the second bit includes N sub-bits, and one sub-bit indicates a quantity of training sequences corresponding to one STA.

In a possible implementation, the first STA determines, based on antenna capability information of the first STA, the quantity of training sequences corresponding to the first STA.

According to a fourth aspect, this application provides a channel sounding method. The method includes: A central controller determines N STAs on which channel sounding needs to be performed, where N is an integer greater than 1. The central controller sends notification information to a first AP, where the notification information includes identification information of the N STAs, and the notification information is used to indicate to perform channel sounding on the N STAs. Based on this solution, the central controller may indicate the first AP to perform channel sounding on the N STAs, thereby improving channel sounding efficiency.

In a possible implementation, the notification information further includes antenna capability information separately corresponding to the N STAs, and antenna capability information of one STA is used to determine a quantity of training sequences corresponding to the STA.

In a possible implementation, the central controller determines the first AP.

In a possible implementation, the central controller separately sends indication information to M second APs, where the indication information is used to indicate to follow an indication of a trigger frame of the first AP.

In a possible implementation, the central controller determines the M second APs.

In a possible implementation, the central controller receives the identification information of the N STAs.

In a possible implementation, the central controller receives the antenna capability information separately corresponding to the N STAs.

According to a fifth aspect, this application provides a training sequence transmission apparatus. The apparatus may be an AP, or may be a chip used for an AP. The apparatus has a function of implementing the embodiments of the first aspect. The function may be implemented by hardware, or may be implemented by hardware executing corresponding software. The hardware or the software includes one or more modules corresponding to the function.

According to a sixth aspect, this application provides a training sequence transmission apparatus. The apparatus may be an AP, or may be a chip used for an AP. The apparatus has a function of implementing the embodiments of the second aspect. The function may be implemented by hardware, or may be implemented by hardware executing corresponding software. The hardware or the software includes one or more modules corresponding to the function.

According to a seventh aspect, this application provides a training sequence transmission apparatus. The apparatus may be a STA, or may be a chip used for a STA. The apparatus has a function of implementing the embodiments of the third aspect. The function may be implemented by hardware, or may be implemented by hardware executing corresponding software. The hardware or the software includes one or more modules corresponding to the function.

According to an eighth aspect, this application provides a training sequence transmission apparatus. The apparatus may be a central controller, or may be a chip used for a central controller. The apparatus has a function of implementing the embodiments of the fourth aspect. The function may be implemented by hardware, or may be implemented by hardware executing corresponding software. The hardware or the software includes one or more modules corresponding to the function.

According to a ninth aspect, this application provides a training sequence transmission apparatus, including a processor and a memory. The memory is configured to store computer-executable instructions. When the apparatus runs, the processor executes the computer-executable instructions stored in the memory, so that the apparatus performs the methods according to the foregoing aspects.

According to a tenth aspect, this application provides a training sequence transmission apparatus, including units or means (means) configured to perform the steps in the foregoing aspects.

According to an eleventh aspect, this application provides a training sequence transmission apparatus, including a processor and an interface circuit. The processor is configured to communicate with another apparatus through the interface circuit, and perform the methods according to the foregoing aspects. There are one or more processors.

According to a twelfth aspect, this application provides a training sequence transmission apparatus, including a processor, configured to connect to a memory, and configured to invoke a program stored in the memory, to perform the methods according to the foregoing aspects. The memory may be located inside the apparatus, or may be located outside the apparatus. In addition, there are one or more processors.

According to a thirteenth aspect, this application further provides a computer-readable storage medium. The computer-readable storage medium stores instructions; and when the instructions are run on a computer, the computer is enabled to perform the method according to the foregoing aspects.

According to a fourteenth aspect, this application further provides a computer program product including instructions; and when the computer program product runs on a computer, the computer is enabled to perform the method according to the foregoing aspects.

According to a fifteenth aspect, this application further provides a chip system. The chip system includes a processor, configured to perform the methods according to the foregoing aspects.

According to a sixteenth aspect, this application further provides a training sequence transmission system, including an AP configured to perform the method according to any one of the implementations of the first aspect and an AP configured to perform the method according to any one of the implementations of the second aspect.

In a possible implementation, the training sequence transmission system further includes a central controller configured to perform the method according to any one of the implementations of the fourth aspect.

In a possible implementation, the training sequence transmission system further includes a STA configured to perform the method according to any one of the implementations of the third aspect.

BRIEF DESCRIPTION OF DRAWINGS

FIG. 8 is a format of a common info field in a trigger frame;

FIG. 9 is a format of a user info field in a trigger frame;

DESCRIPTION OF EMBODIMENTS

To make objectives, technical solutions, and advantages of this application clearer, the following further describes this application in detail with reference to accompanying drawings. A specific operation method in a method embodiment may also be applied to an apparatus embodiment or a system embodiment. In descriptions of this application, unless otherwise specified, "a plurality of" means two or more than two.

Figure 1:
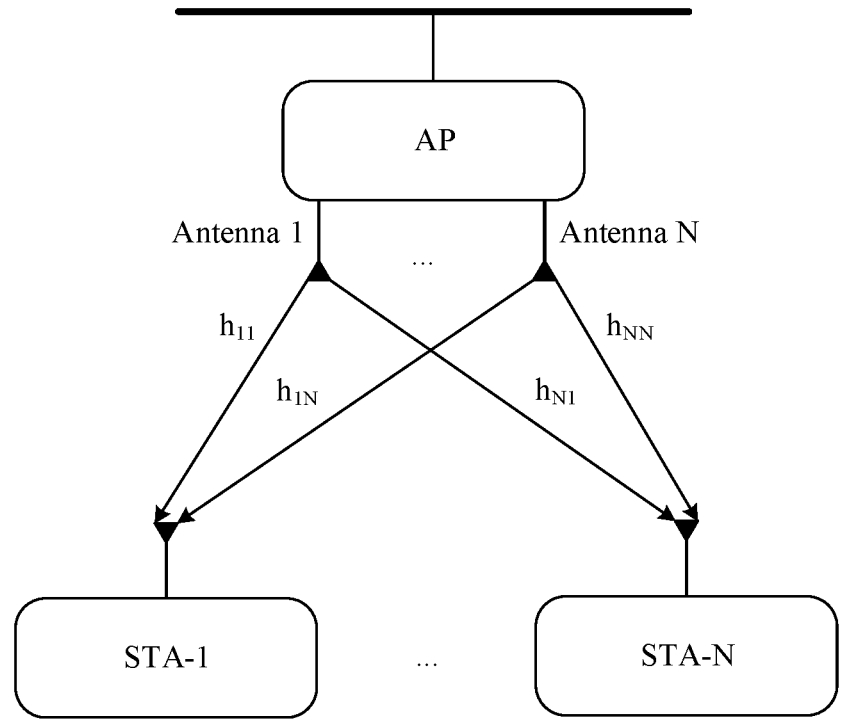
FIG. 1 is a schematic diagram of a possible network architecture according to this application.

FIG. 1 is a schematic diagram of a possible network architecture to which this application is applicable. The network architecture includes one AP and N STAs (separately referred to as a STA-1, a STA-2, . . . , and a STA-N), and N is an integer greater than 1. The AP includes a plurality of antennas (in the figure, an example in which N antennas are included is used), and each STA includes one or more antennas (in the figure, an example in which each STA includes one antenna is used). A relationship between a quantity of antennas of the AP and quantities of antennas of the N STAs needs to meet that the quantity of antennas of the AP is greater than or equal to a sum of the quantities of antennas of the N STAs. For ease of description, in FIG. 1 of this application, an example in which each STA includes one antenna, and the AP includes N antennas is used for description.

The architecture shown in FIG. 1 may also be referred to as a multi-user multiple-input multiple-output (MU-MIMO) technology architecture. One AP may send data to a plurality of STAs.

Figure 2:
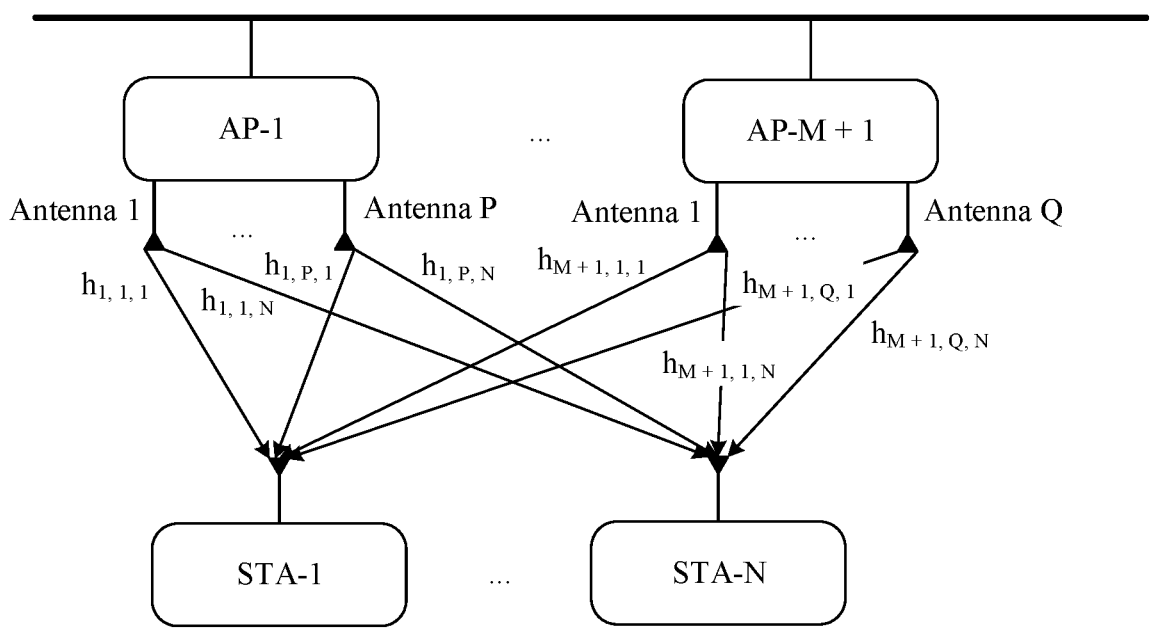
FIG. 2 is a schematic diagram of another possible network architecture according to this application.
Figure 3:
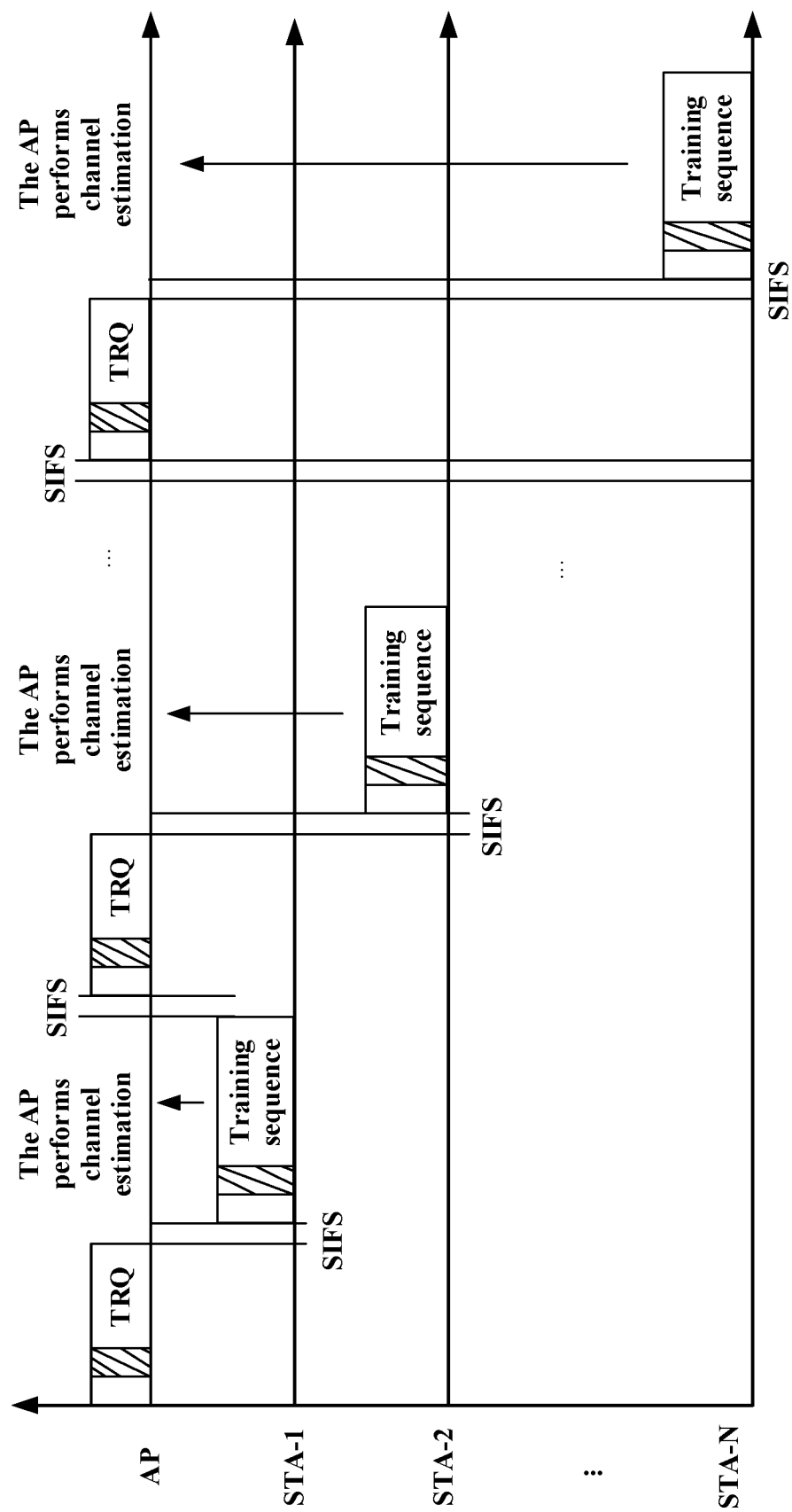
FIG. 3 is a schematic diagram of a training sequence transmission method in the conventional technology.

FIG. 2 is a schematic diagram of another possible network architecture to which this application is applicable. The network architecture includes M+1 APs (separately referred to as an AP-1, an AP-2, . . . , and an AP-M+1) and N STAs (separately referred to as a STA-1, a STA-2, . . . , and a STA-N), M is a positive integer, and N is an integer greater than 1. Each AP includes one or more antennas (in the figure, an example in which the AP-1 includes P antennas, where P is a positive integer; and the AP-M+1 includes Q antennas, where Q is a positive integer is used). Each STA includes one or more antennas (in the figure, an example in which each STA includes one antenna is used). A relationship between quantities of antennas of the M+1 APs and quantities of antennas of the N STAs needs to meet that a sum of the quantities of antennas of the M+1 APs is greater than or equal to a sum of the quantities of antennas of the N STAs. For ease of description, in FIG. 2 of this application, an example in which each STA includes one antenna is used for description.

There is one master AP (also referred to as a first AP in this application) in the M+1 APs, and the other M APs are slave APs (also referred to as second AP in this application). The master AP may broadcast a trigger frame to each STA and each slave AP. The trigger frame is used to trigger each STA to report a channel sounding frame, and trigger each slave AP to determine whether to enter a channel sounding standby state (or referred to as a channel estimation standby state). In other words, each slave AP is triggered to determine whether the slave AP is ready to receive the channel sounding frame reported by each STA.

The architecture shown in FIG. 2 may also be referred to as a network multiple-input multiple-output (Network-MIMO) technology architecture. A plurality of APs cooperate with each other by using a central controller or under wireless control, and the plurality of APs may be virtualized into one AP to send a plurality of user data flows.

In this application, the AP is a device that provides a bridging function between a wired network and a wireless network. Generally, one end of the AP is connected to a backbone network in a wired manner to transfer a baseband data flow, and the other end of the AP sends the data flow to the STA in a wireless manner by using a radio frequency unit.

In this application, the STA is a terminal configured with a wireless local area network (WLAN) function module, for example, may be a mobile phone or a notebook. It should be noted that the STA in this application is a non-AP STA, in other words, the STA and the AP in this application are different devices.

In this application, the central controller is a network device that has a processing function, for example, a server.

Figure 4:
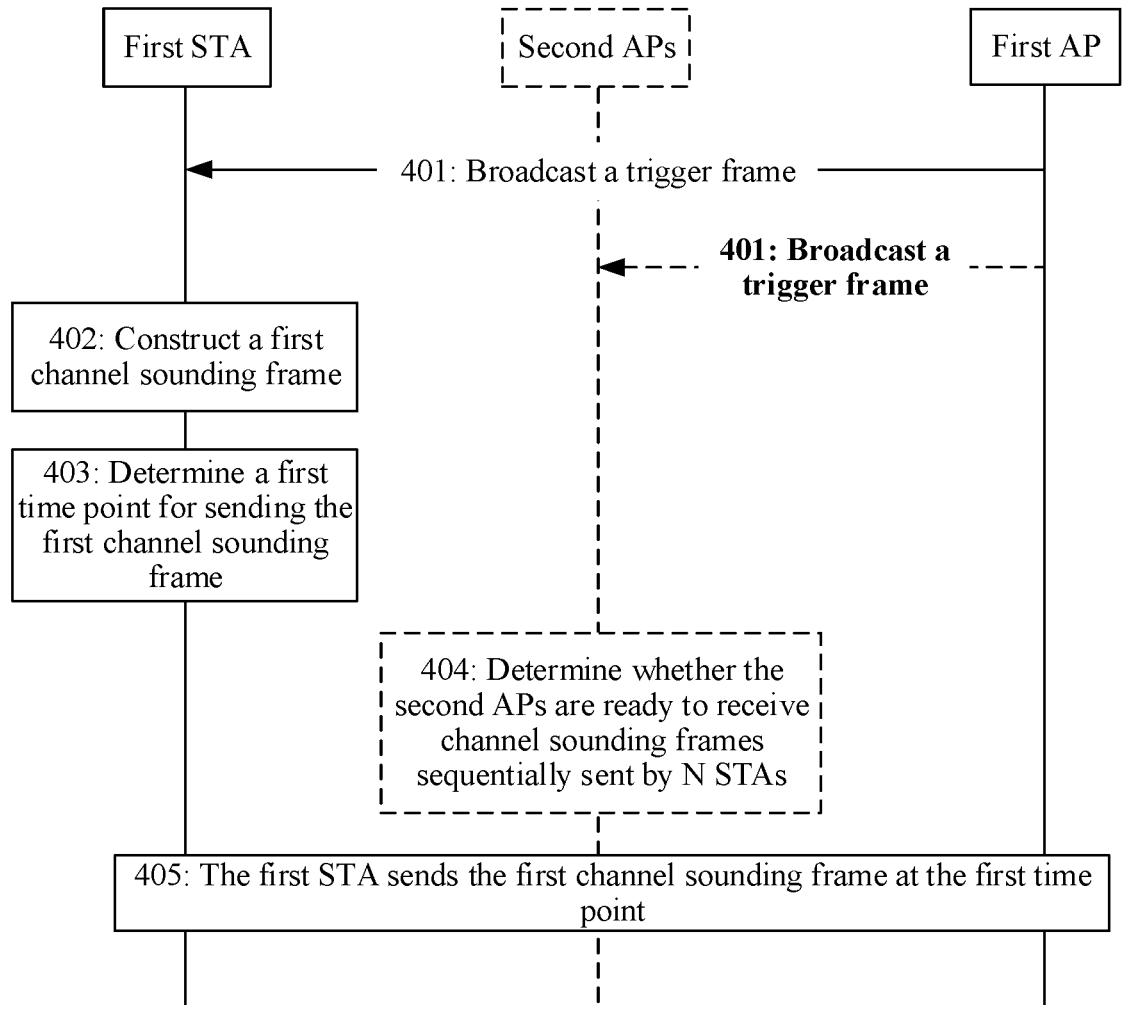
FIG. 4 is a schematic flowchart of a training sequence transmission method according to this application.

To resolve problems in the technical solution in the background, as shown in FIG. 4, this application provides a training sequence transmission method. The method may be applied to the architecture of a single AP and a plurality of STAs shown in FIG. 1, or may be applied to the architecture of a plurality of APs and a plurality of STAs shown in FIG. 2.

For ease of description, for the architecture shown in FIG. 1, the AP may also be referred to as a first AP. For the architecture shown in FIG. 2, one AP of the M+1 APs may be referred to as a first AP (or may be referred to as a master AP), and the other M APs may all be referred to as second AP (or all referred to as slave APs). A unified description is provided herein, and details are not described later.

The method includes the following steps.

Step 401: A first AP broadcasts a trigger frame.

The trigger frame indicates a time sequence of separately sending channel sounding frames by N STAs, and N is an integer greater than 1. The trigger frame is used to trigger the N STAs to construct the channel sounding frames based on a quantity of training sequences corresponding to each of the N STAs, and sequentially send the channel sounding frames.

Optionally, the trigger frame includes the quantity of training sequences corresponding to each of the N STAs.

Optionally, the trigger frame includes time points at which the N STAs separately send the channel sounding frames.

For the architecture shown in FIG. 1, the first AP broadcasts the trigger frame to the N STAs.

For the architecture shown in FIG. 2, the first AP broadcasts the trigger frame to the N STAs and the M second APs, where M is a positive integer. Further, the trigger frame further indicates whether the M second APs are ready to receive the channel sounding frames sequentially sent by the N STAs.

For any STA (for example, a first STA) in the N STAs, the following step 402 to step 404 are performed.

Step 402: The first STA constructs a first channel sounding frame based on a quantity of training sequences corresponding to the first STA, where the first channel sounding frame includes one or more training sequences.

In an implementation, if the trigger frame includes the quantity of training sequences corresponding to each of the N STAs, the first STA obtains the quantity of training sequences corresponding to the first STA from the trigger frame. For example, a quantity of training sequences included in the first channel sounding frame is equal to the quantity of training sequences corresponding to the first STA. For example, if the quantity of training sequences corresponding to the first STA in the trigger frame is five, the first channel sounding frame constructed by the first STA includes five training sequences.

In another implementation, if the trigger frame does not include the quantity of training sequences corresponding to each of the N STAs, the first STA determines, based on antenna capability information of the first STA, the quantity of training sequences corresponding to the first STA. For example, the quantity of training sequences included in the first channel sounding frame is equal to a quantity of antennas of the first STA. For example, if the quantity of antennas of the first STA is five, the first channel sounding frame constructed by the first STA includes five training sequences.

Step 403: The first STA determines a first time point for sending the first channel sounding frame.

In an implementation, the first STA may determine a second STA based on the time sequence of separately sending the channel sounding frames by the N STAs, where a time sequence of sending a channel sounding frame by the second STA is earlier than a time sequence of sending a channel sounding frame by the first STA. Then, the first STA determines, based on duration in which the second STA sends the channel sounding frame, the first time point for sending the first channel sounding frame. The first STA may determine, based on a quantity of training sequences corresponding to the second STA, the duration in which the second STA sends the channel sounding frame. For example, the trigger frame indicates that the time sequence of separately sending the channel sounding frames by the N STAs is: a STA-1, a STA-2, . . . , and a STA-N. If the first STA is a STA-5, the STA-5 may determine, based on durations in which the STA-1, the STA-2, a STA-3, and a STA-4 send channel sounding frames, a first time point at which the STA-5 sends the first channel sounding frame. If the first STA is a STA-8, the STA-8 may determine, based on durations in which the STA-1, the STA-2, the STA-3, the STA-4, the STA-5, a STA-6, and a STA-7 send channel sounding frames, a first time point at which the STA-8 sends the first channel sounding frame. The rest may be deduced by analogy.

In another implementation, if the trigger frame includes the time points at which the N STAs separately send the channel sounding frames, the first STA obtains the first time point for sending the first channel sounding frame from the trigger frame.

Step 404: The second AP determine, based on the trigger frame, whether the second AP are ready to receive the channel sounding frames sequentially sent by the N STAs.

The second AP receive, in step 401, the trigger frame broadcast by the first AP, and optionally, the trigger frame further indicates whether the M second APs are ready to receive the channel sounding frames sequentially sent by the N STAs. Therefore, the M second APs may determine, based on information indicated in the trigger frame, that the M second APs are ready to receive the channel sounding frames sequentially sent by the N STAs, or are not ready to receive the channel sounding frames sequentially sent by the N STAs. For example, the second AP may determine whether the trigger frame includes identifier of the second AP, to determine that whether the second AP are ready to receive the channel sounding frames sequentially sent by the N STAs. If the trigger frame includes the identifier of the second AP, the second AP determine to receive the channel sounding frames sequentially sent by the N STAs. If the trigger frame does not include the identifier of the second AP, the second AP determine not to receive the channel sounding frames sequentially sent by the N STAs.

Alternatively, the trigger frame does not indicate whether the M second APs are ready to receive the channel sounding frames sequentially sent by the N STAs. Instead, a central controller indicates whether the M second APs are ready to receive the channel sounding frames sequentially sent by the N STAs.

Being ready to receive the channel sounding frames sequentially sent by the N STAs may also be understood as entering a channel estimation standby state or a channel sounding standby state. This solution is applicable to a scenario in which the plurality of APs simultaneously perform channel sounding shown in the architecture in FIG. 2.

Being not ready to receive the channel sounding frames sequentially sent by the N STAs may also be understood as not entering the channel estimation standby state or the channel sounding standby state. This solution is applicable to a scenario in which only one AP (namely, the first AP) performs channel sounding in the architecture shown in FIG. 1.

Step 404 is an optional step.

Certainly, the trigger frame or the central controller may not indicate whether the M second APs are ready to receive the channel sounding frames sequentially sent by the N STAs, but it is specified that all APs that receive the trigger frame receive the channel sounding frames sequentially sent by the N STAs.

Step 405: The first STA sends the first channel sounding frame at the first time point.

The first AP may receive the channel sounding frames sequentially sent by the N STAs. One channel sounding frame includes one or more training sequences, and a quantity of training sequences included in the channel sounding frame is specified by the trigger frame.

Optionally, if step 404 is performed, the M second APs may also receive the channel sounding frames sequentially sent by the N STAs.

The first AP may sequentially receive the channel sounding frames separately sent by the N STAs. Optionally, the first AP may determine, based on the following method, which STA sends which channel sounding frame: If the first AP receives the first channel sounding frame at a second time point, the first AP determines a time point closest to the second time point in the time points at which the N STAs separately send the channel sounding frames, for example, the first time point, and determines that a STA corresponding to the first time point (namely, the first STA) is a STA that sends the first channel sounding frame.

For the M second APs, a correspondence between a channel sounding frame and a STA, that is, which STA sends which channel sounding frame may also be determined by using a same method.

In this application, the reason why which STA sends which channel sounding frame may be determined by using the method is as follows: An interval between the channel sounding frames that are sent by the N STAs is at least 16 (short interframe space)+40 (physical frame header)=56 µs (for details, see time calculation shown in Example 1 and Example 2). Because STAs with a closest time point need to be selected, a half of the 56 µs is used as a dividing line. Therefore, in wireless space, a transmission distance is 8400 m (the light speed×28 µs). An indoor wireless transmission distance is definitely less than 8400 m (a basic indoor distance is within 1000 m). Therefore, it is reliable to use the first time point and the second time point as the determining basis.

The foregoing implementation may also be understood as follows: The first AP and the M second APs determine, based on the time sequence of separately sending the channel sounding frames by the N STAs, the time points at which the N STAs separately send the channel sounding frames. For any channel sounding frame in the N channel sounding frames separately sent by the N STAs, the first AP and the M second APs determine a second time point at which the channel sounding frame is received, and determine a first time point closest to the second time point in the time points at which the N STAs separately send the channel sounding frames; determine that a STA corresponding to the first time point is a STA corresponding to the channel sounding frame; and obtain a quantity of training sequences from the STA corresponding to the channel sounding frame, and use the quantity as a quantity of training sequences corresponding to the STA.

In an alternative implementation, the first AP and the M second APs may alternatively determine, by using the following method, which STA sends which channel sounding frame: After receiving the trigger frame, the N STAs may separately determine, based on the time sequence of separately reporting the channel sounding frames by the N STAs indicated in the trigger frame, a sequence of reporting the channel sounding frame by each STA. To be specific, a sequence of STA information corresponding to an association identifier of the STA in the trigger frame is recorded, and the sequence information is added when the channel sounding frames are constructed. After receiving the channel sounding frames, the first AP and the M second APs obtain corresponding fields of the channel sounding frames to obtain the sequence of the STA, and then obtain the association identifier (namely, an identifier of the STA) in the STA information corresponding to the sequence in the trigger frame. In this way, it can be determined which STA reports the channel sounding frame. The method may be understood as follows: For any channel sounding frame in the N channel sounding frames separately sent by the N STAs, the first AP and the M second APs determine, based on sequence information of the channel sounding frame and the time sequence of separately sending the channel sounding frames by the N STAs, STA information corresponding to the sequence information in the trigger frame; determine that a STA indicated by the STA information is a STA corresponding to the channel sounding frame; and obtain a quantity of training sequences from the STA corresponding to the channel sounding frame, and use the quantity as a quantity of training sequences corresponding to the STA.

In another alternative implementation, the first AP and the M second APs may alternatively determine, by using the following method, which STA sends which channel sounding frame: When the N STAs receive the trigger frame to construct the channel sounding frames, the identifier (also referred to as the association identifier) of each STA may be added to the corresponding fields of the channel sounding frames. After receiving the channel sounding frames, the first AP and the M second APs obtain the corresponding fields of the channel sounding frames, to obtain the association identifier of the STA in the channel sounding frames, that is, determine that which STA sends the channel sounding frame. The method may be understood as follows: For the first channel sounding frame, the first channel sounding frame is any channel sounding frame in the channel sounding frames separately sent by the N STAs, the first channel sounding frame includes STA information, and the first AP and the M second APs determine a STA indicated by the STA information as a STA corresponding to the first channel sounding frame.

According to the foregoing solution, the first AP broadcasts one trigger frame, so that the N STAs can be triggered to sequentially send the channel sounding frames. After receiving the channel sounding frames sequentially reported by the STAs, the first AP may separately perform sounding, based on the training sequences in the channel sounding frames, on channels between the first AP and the STAs, to learn of channel state information between the first AP and the STAs.

Based on the foregoing solution of step 401 to step 403 and step 405, compared with a channel sounding method in the architecture of a single AP and N STAs in the conventional technology, the solution has the following beneficial effects: In this solution, only one trigger frame needs to be sent, so that the N STAs can be triggered to separately report the channel sounding frames to one AP. However, in the conventional technology, an AP needs to send one TRQ to each STA, that is, N TRQs are sent in total, to trigger each STA to report a training sequence. Therefore, this solution can significantly reduce signaling overheads.

Based on the foregoing solution of step 401 to step 405, compared with a channel sounding method in the architecture of M+1 APs and N STAs in the conventional technology, the solution has the following beneficial effects: In this solution, only one trigger frame needs to be sent, so that the N STAs can be triggered to separately report the channel sounding frames to the M+1 APs. However, in the conventional technology, each AP needs to send one TRQ to each STA, that is, N×(M+1) TRQs are sent in total, to trigger each STA to report a training sequence. Therefore, this solution can significantly reduce signaling overheads.

For the foregoing solution 1 based on the architecture shown in FIG. 1 (namely, the solution of step 401 to step 403 and step 405) or for the foregoing solution 2 based on the architecture shown in FIG. 2 (namely, the solution of step 401 to step 405), before step 401, either of the following two methods may alternatively be used to trigger execution of the foregoing solution 1 or solution 2. Descriptions are separately provided below.

Method 1: The First AP Triggers Execution of the Foregoing Solution 1 or Solution 2.

For example, the first AP may determine STAs on which channel sounding needs to be performed. For example, the first AP may determine that channel sounding needs to be performed on STAs that have data requests or whose channel information is aged (to be specific, channel information obtained through sounding last time has exceeded a coherence time when a channel does not change or a fixed time set by a system) (namely, the foregoing N STAs). Certainly, in actual application, it may alternatively be determined that sounding needs to be performed on some STAs in the N STAs.

Based on the solution 2 of the architecture shown in FIG. 2, before step 401, the first AP may further separately send indication information to the M second APs, where the indication information is used to indicate the M second APs to follow an indication of the trigger frame of the first AP.

Method 2: The Central Controller Triggers Execution of the Foregoing Solution 1 or Solution 2.

Based on the method, before step 401, the central controller may determine the N STAs on which channel sounding needs to be performed, and then send notification information to the first AP, where the notification information includes identification information of the N STAs, and the notification information is used to indicate to perform channel sounding on the N STAs. The central controller may determine that channel sounding needs to be performed on STAs that have data requests or whose channel information is aged (to be specific, channel information obtained through sounding last time has exceeded a coherence time when a channel does not change or a fixed time set by a system) (namely, the foregoing N STAs). Certainly, in actual application, it may alternatively be determined that sounding needs to be performed on some STAs in the N STAs.

Optionally, the central controller may further enable the notification information to carry antenna capability information separately corresponding to the N STAs, and antenna capability information of one STA is used to determine a quantity of training sequences corresponding to the STA.

Based on the solution 2 of the architecture shown in FIG. 2, before step 401, the first AP may further separately send indication information to the M second APs, where the indication information is used to indicate the M second APs to follow an indication of the trigger frame of the first AP.

Based on the solution 2, optionally, the central controller may further determine the first AP (namely, the master AP) and the M second APs (namely, the slave APs).

For example, if a STA under an AP has a data request, and a frequency channel of the AP is not occupied, the AP is selected as an AP that needs to perform channel sounding. For example, finally selected APs that need perform channel sounding are the M+1 APs.

Further, the central controller may select one first AP (namely, the master AP) from the M+1 APs, and the other M APs serve as the second AP (namely, the slave APs). The slave APs need to follow the indication of the trigger frame of the master AP.

The method for selecting the first AP by the central controller includes but is not limited to:

(1) The central controller selects the first AP based on a service. An AP with a maximum service volume is selected as the first AP, in other words, STAs under the selected first AP establish a maximum quantity of data services.

(2) The central controller selects the first AP based on a location. A relatively central AP is selected as the first AP, so that all APs and STAs can receive a broadcast signal of the trigger frame.

(3) The central controller selects the first AP based on fairness. All APs serve as first APs in turn.

Optionally, the antenna capability information of each STA stored in the central controller may be reported by each AP.

Further, for the trigger frame in any one of the foregoing embodiments, in an implementation, first information may be carried in a frame body of the trigger frame. The first information is used to indicate information about the quantity of training sequences corresponding to each of the N STAs and information about occupied bits of the quantity of training sequences corresponding to each of the N STAs. For example, the first information indicates that the N STAs correspond to a same quantity of training sequences and the quantity occupies a first bit. For another example, the first information indicates that a quantity of training sequences corresponding to information about the first bit is ignored, the quantity of training sequences corresponding to each of the N STAs occupies a second bit, the second bit includes N sub-bits, and one sub-bit indicates a quantity of training sequences corresponding to one STA.

The following describes the foregoing solutions based on the architecture shown in FIG. 2 and with reference to specific examples.

Figure 5:
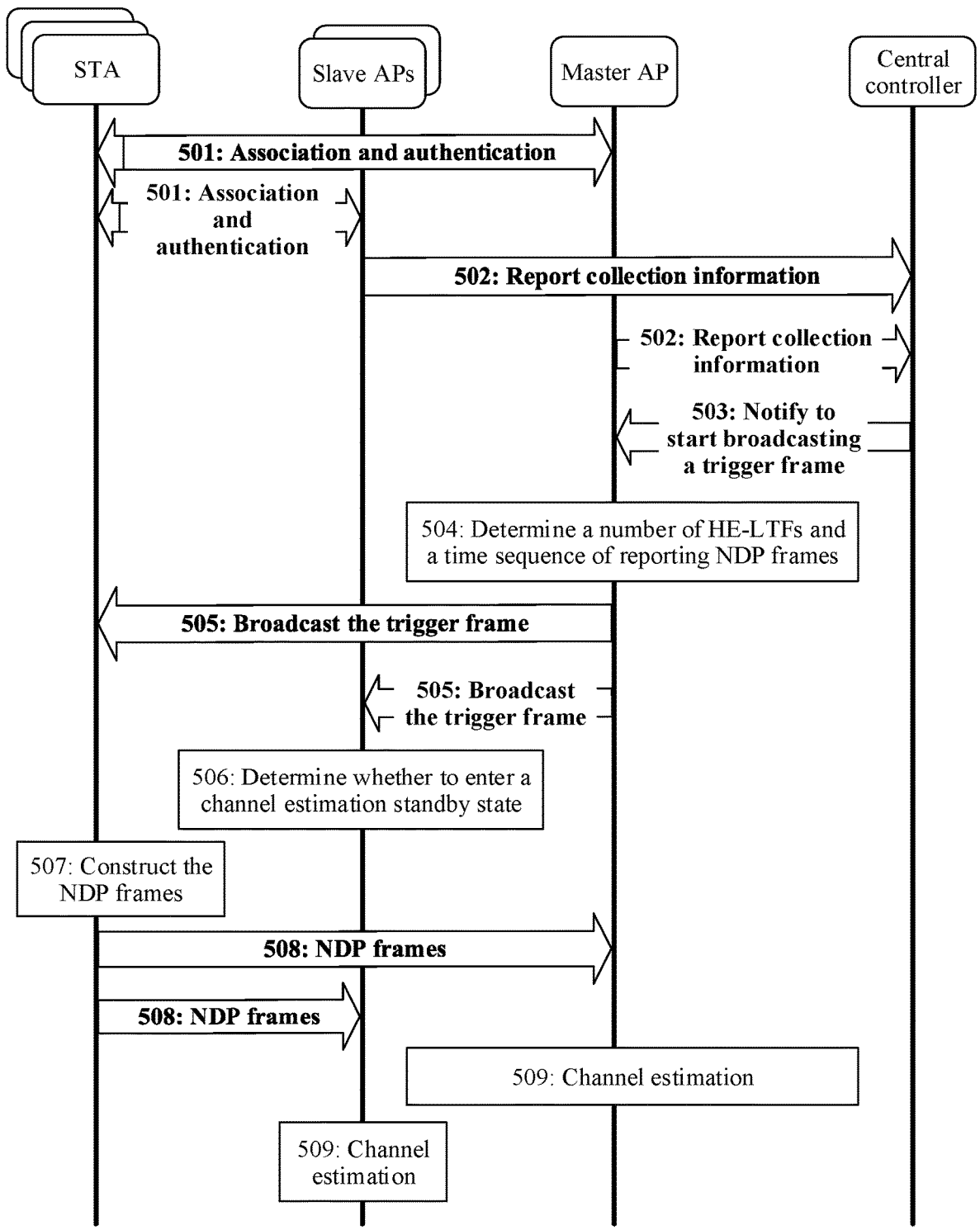
FIG. 5 is a schematic flowchart of a channel sounding method according to this application.

FIG. 5 is a schematic flowchart of a channel sounding method according to this application. The method includes a training sequence transmission method.

It should be noted that, in a procedure shown in FIG. 5, the first AP in the foregoing examples is referred to as a master AP, and the second AP in the foregoing examples are referred to as slave APs. In addition, an example in which a channel sounding frame is an NDP frame and a training sequence is a high efficiency long training sequence (High Efficiency Long Training field, HE-LTF) is used for description.

The method includes the following steps.

Step 501: N STAs separately undergo normal association and authentication processes with M+1 APs.

In this process, each AP records identification (ID) information of the STAs and a quantity of transmit antennas (namely, antenna capability information) included in the STAs. In the normal association process, the two pieces of information are included in information of an association frame.

Step 502: Each AP separately reports collection information to a central controller.

The reported collection information includes the identification information, the antenna capability information, and the like of the STAs that are collected by each AP in step 501.

The central controller stores the collection information reported by the APs, and the information may be used to determine which STAs on which channel sounding needs to be performed.

Step 503: The central controller notifies the master AP to start broadcasting a trigger frame, sequentially sends identifiers ($AID_{User,\ 1}$, $AID_{User,\ 2}$, ..., $AID_{User,\ N}$) of the N STAs on which channel sounding needs to be performed, the antenna capability information ($N_{Tx,\ User_1}$, $N_{Tx,\ User_2}$, ..., $N_{Tx,\ User_N}$) of the N STAs, and identifiers ($BSSID_{AP,\ 1}$, $BSSID_{AP,\ 2}$, ..., $BSSID_{AP,\ M}$) of the M slave AP to the master AP, and further indicates the M slave AP that needs to perform channel sounding together to follow an indication of the trigger frame of the master AP.

It should be noted that, in actual application, the central controller may determine that channel sounding needs to be performed on all the N STAs, or may determine that channel sounding needs to be performed on some STAs in the N STAs. For ease of description, in this embodiment, an example in which channel sounding needs to be performed on all the N STAs (namely, the N STAs) is used for description.

It should be noted that, in any step before step 503, the central controller may further select APs that need to perform channel sounding from the M+1 APs (in this embodiment of this application, an example in which all the M+1 APs need to perform channel sounding is used), and then select one master AP from the M+1 APs and select the other M APs as the slave APs. For a selection method, refer to related descriptions in the embodiment shown in FIG. 4.

Step 504: The master AP determines the number of HE-LTFs that need to be used by the N STAs on which channel sounding needs to be performed and a time sequence of reporting NDP frames.

For example, the master AP may determine, based on the antenna capability information of the STAs, the number of HE-LTFs that need to be used by the STAs.

For example, the master AP may self-determine the time sequence of reporting the NDP frames by the STAs. Alternatively, the time sequence of reporting the NDP frames by the STAs may be determined based on a sequence of sending the identification information and the antenna capability information that are of the N STAs by the central controller.

Optionally, the central controller may send the number of HE-LTFs that need to be used by the N STAs on which channel sounding needs to be performed and the time sequence of reporting the NDP frames to the master AP.

Step 505: The master AP constructs the trigger frame, and broadcasts the trigger frame to the STAs and the slave APs.

Step 506: The slave APs receive the trigger frame, determine whether to enter a channel estimation standby state, and obtain the time sequence of reporting the NDP frames by the STAs, to determine which STA reports which NDP frame subsequently.

The time sequence of reporting the NDP frames by the STAs may be used to determine a specific time point at which each STA reports the NDP frame.

Optionally, if the trigger frame includes the time point at which each STA reports the NDP frame, the specific time point at which each STA reports the NDP frame may be directly obtained from the trigger frame.

Step 507: The STAs receive the trigger frame, determine the number of HE-LTFs, and construct the NDP frames based on the number of HE-LTFs.

If the trigger frame includes the number of HE-LTFs, the number of HE-LTFs is obtained from the trigger frame. If the trigger frame does not include the number of HE-LTFs, the STAs determine the number of HE-LTFs based on the antenna capability information of the STAs.

Optionally, after receiving the trigger frame, each STA determines, based on the time sequence of separately reporting the channel sounding frames by the N STAs indicated in the trigger frame, a sequence of reporting the channel sounding frame by the STA. To be specific, a sequence of STA information corresponding to an association identifier of the STA in the trigger frame is recorded, and the sequence information is added to the NDP frames when the NDP frames are constructed. Alternatively, the STA adds association identifier of the STA (namely, an identifier of the STA) to the NDP frames.

Step 508: Each STA sends the NDP frame to the master AP and the slave APs based on a delay for sending the NDP frame that is calculated by the STA.

Certainly, if the trigger frame includes the delay for sending the NDP frame by each STA, each STA does not need to calculate the delay for sending the NDP frame, but directly obtains the delay from the trigger frame.

Figure 6:
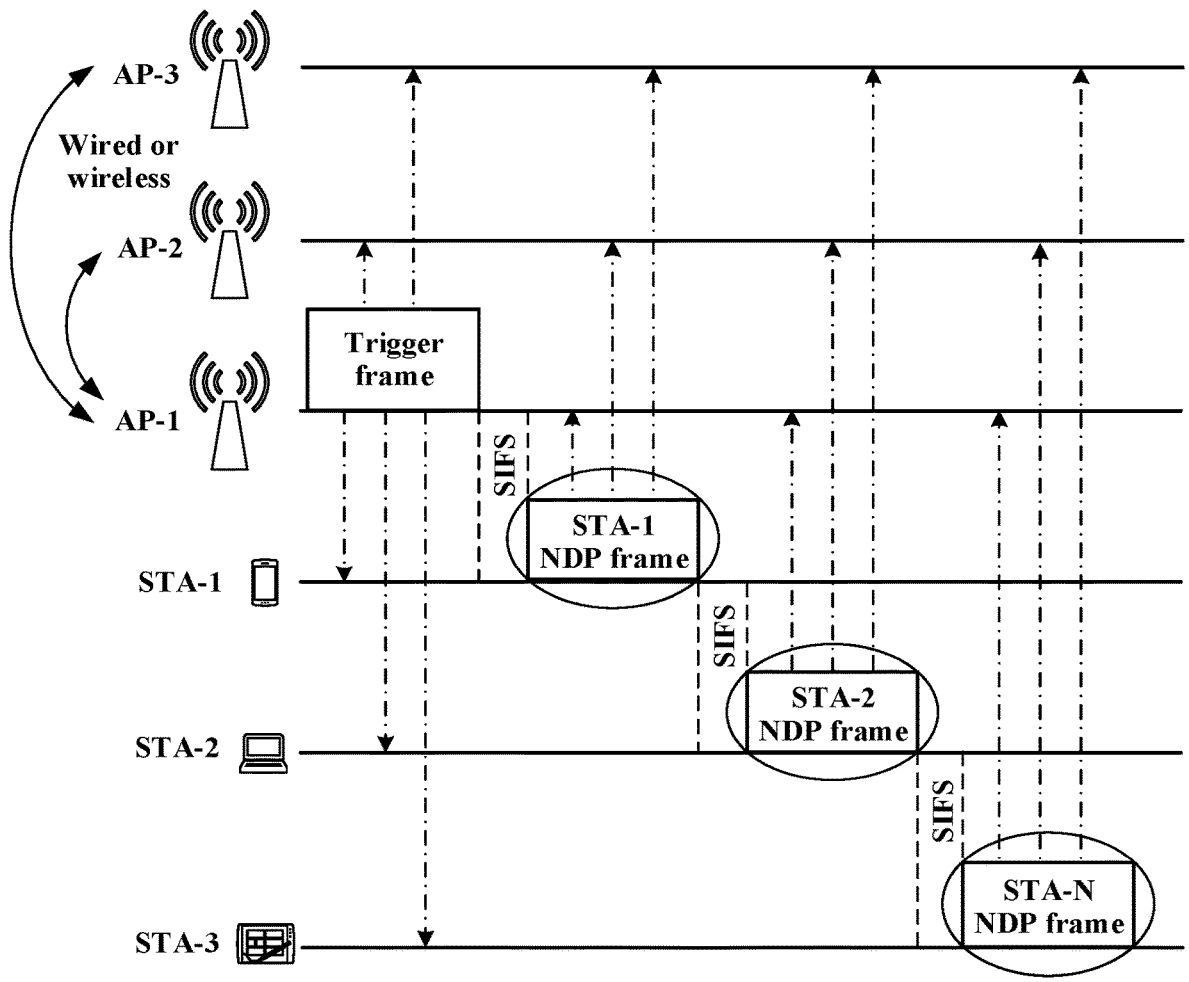
FIG. 6 is a schematic diagram in which each STA reports an NDP frame.

FIG. 6 is a schematic diagram in which each STA (a value of N is 3) reports an NDP frame. In the figure, an example in which an AP-1 is a master AP, and an AP-2 and an AP-3 are slave APs (in other words, a value of M is 2) is used. It can be learned that each STA sequentially reports an NDP frame constructed by the STA.

Step 509: The master AP and the slave APs determine, based on a sequence of the STAs in the trigger frame, the STAs that report the NDP frames, and simultaneously perform channel estimation based on the number of HE-LTFs indicated by the STAs in the trigger frame.

The master AP and the slave APs determine, based on the time sequence of sending the NDP frames by the STAs, the specific time point at which each STA reports the NDP frame.

Optionally, if the trigger frame includes the time point at which each STA reports the NDP frame, the AP may directly obtain the specific time point at which each STA reports the NDP frame from the trigger frame.

Then, the master AP and the slave APs determine, based on time points at which the DSP frames are received and the time points at which the STAs report the NDP frames, which STA reports which NDP frame. For a specific implementation, refer to related descriptions in step 405. Details are not described herein again.

For a specific implementation in which the master AP and the slave APs perform channel estimation based on the number of HE-LTFs indicated by the STAs in the trigger frame, refer to related descriptions in the conventional technology. Details are not described herein again.

For a specific implementation process of this step, refer to a related solution in the conventional technology. Details are not described herein again.

In the foregoing embodiment, the newly designed trigger frame has the following beneficial effects:

(1) Fast and efficient self-delay implicit channel sounding is implemented.

(2) A trigger frame may trigger all STAs on which channel sounding needs to be performed, and schedule a plurality of STAs at one time to send NDP frames.

(3) A trigger frame may be sent by using a frame on an air interface, to indicate other APs (slave APs) to wait for and respond to NDP frames sent by STAs, so that a plurality of APs simultaneously perform channel sounding, and a repeated channel sounding process of the plurality of APs is reduced.

(4) A STA automatically delays a corresponding time and sends NDP frames in a time sharing manner by using delay information in a trigger frame, thereby reducing frame overheads and air interface time overheads.

The following describes a process of constructing the trigger frame in this application with reference to specific examples.

Example 1: The Trigger Frame is Designed Based on a Frame Format in the Conventional Technology In Example 1, the trigger frame may also be referred to as a trigger self-delay sounding (Trigger self-delay sounding, TSDS) frame.

Figure 7:
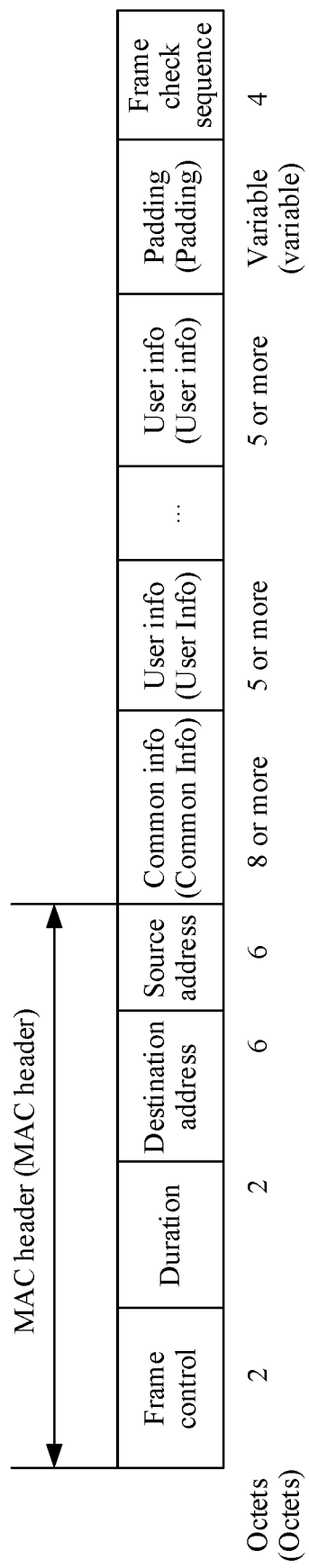
FIG. 7 is a format of an 802.11ax trigger frame in the conventional technology.

FIG. 7 shows a format of an 802.11ax trigger frame in the conventional technology (refer to the 802.11ax D3.2 FIG. 9-63a). In the present invention, a common info (Common Info) field and a user info (User Info) field in the trigger frame are modified, and functions of other fields are still functions of conventional modules, to form a new trigger frame, namely, the TSDS frame in this application.

The user info field is the STA information in the foregoing embodiments, and is used to record related information of a STA.

FIG. 8 shows a format of the common info field in the trigger frame shown in FIG. 7, namely, a format of the common info field in the 802.11ax trigger frame (refer to the 802.11ax D3.2 FIG. 9-63b).

In a design of the TSDS frame in this application, the common info field of the trigger frame shown in FIG. 7 is modified as follows:

(1) Types of the trigger frame are added to a trigger type subfield. Table 2.1 shows modified types of the 802.11ax trigger frame.

TABLE 2.1

Types of the 802.11ax trigger frame

| Trigger type subfield value (Trigger Type) | Trigger frame variant (Trigger frame variant) |
|---|---|
| 0 | Basic trigger frame |
| 1 | Beamforming report poll (BFRP) |
| 2 | Multi-user block acknowledgment request |
| 3 | Multi-user request to send |
| 4 | Buffer status report poll (BSRP) |
| 5 | Group cast with retries multi-user block acknowledgment request |
| 6 | Bandwidth query report poll (BQRP) |
| 7 | NDP feedback report poll (NFRP) |
| 8 | Trigger self-delay sounding (TSDS) |
| 9-15 | Reserved (Reserved) |

A field before "1000" ("8" in decimal) is a reserved field. In this application, "1000" ("8" in decimal) is defined to indicate the TSDS frame.

(2) A trigger dependent common info (Trigger Dependent Common Info) subfield is customized in the common info field.

The subfield may be customized, and the conventional 802.11ax trigger frame implements different functions based on the subfield to indicate how to allocate the number of HE-LTFs in the NDP frames. This subfield defines eight bits, namely, B64 to B71. Different values indicate different operations. Table 2.2 shows customization of the trigger dependent common info subfield in the common info field of the TSDS frame in this application.

TABLE 2.2

Customization of the trigger dependent common info subfield in the common info field of the TSDS frame

| Values of B64 to B71 (decimal) | Description of the trigger dependent common info subfield |
|---|---|
| 0 | Based on the number of RE-LTFs indicated by B23 to B25 in the common info field, all STAs use the same number of RE-LTFs, and the slave APs do not enter the channel estimation standby state after receiving the TSDS frame |
| 1 | Based on the number of RE-LTFs indicated by B23 to B25 in the common info field, all STAs use the same number of RE-LTFs, and the slave APs enter the channel estimation standby state after receiving the TSDS frame |
| 2 | Regardless of the number of HE-LTFs indicated by B23 to B25 in the common info field, each STA uses the number of RE-LTFs indicated by each user-info SS allocation subfield, and the slave APs do not enter the channel estimation standby state after receiving the TSDS frame |
| 3 | Regardless of the number of HE-LTFs indicated by B23 to B25 in the common info field, each STA uses the number of RE-LTFs indicated by each user-info SS allocation subfield, and the slave APs enter the channel estimation standby state after receiving the TSDS frame |
| 4-255 | A BSSID AP is reserved/specified for channel estimation |

FIG. 9 shows a format of the user info field in the trigger frame shown in FIG. 7, namely, a format of the user info field in the 802.11ax trigger frame (refer to the 802.11ax D3.2 FIG. 9-63e).

In the design of the TSDS frame of this application, the user info field of the trigger frame shown in FIG. 9 is modified as follows:

(1) The master AP assigns, based on the determined number of HE-LTFs required by each STA and the time sequence of reporting the NDP frames, a value to the number of spatial streams in an SS allocation/RA-RU information subfield indicated by B26 to B31 of each STA. The value needs to be equal to "$N_{Tx,User_1}-1$".

Table 2.3 shows values of the number of spatial streams defined in this application.

TABLE 2.3

Definition of the number of spatial streams

| Values | Number of spatial streams |
|---|---|
| 0 | $N_{TX,User\,n} = 1$ |
| 1 | $N_{TX,User\,n} = 2$ |
| 2 | $N_{TX,User\,n} = 3$ |
| ... | ... |

For example, when the value of the number of spatial streams is 0, it indicates that the number of HE-LTFs required by a corresponding STA is 1. For another example, when the value of the number of spatial streams is 1, it indicates that the number of HE-LTFs required by a corresponding STA is 2.

It should be noted that if all the STAs need to have the same number of HE-LTFs, the master AP may use the number of HE-LTFs indicated by B23 to B25 in the common info field.

With reference to step 506 in the embodiment in FIG. 5, the slave APs receive the TSDS frame, obtains a value of the trigger dependent common info subfield, and determines whether to enter the channel estimation standby state. Refer to Table 2.2. If the value of the trigger dependent common info subfield is 0 or 2, the slave APs determine not to enter the channel estimation standby state. If the value of the trigger dependent common info subfield is 1 or 3, the slave APs determine to enter the channel estimation standby state.

It should be noted that the slave APs herein refer to the slave APs that follow an indication of the TSDS frame that is sent by the master AP in step 503.

With reference to step 507 in the embodiment in FIG. 5, after receiving the TSDS frame, the STAs first check the value of the trigger dependent common info subfield, determine the number of HE-LTFs, and construct the NDP frames based on the number of HE-LTFs. For example, if the value of the trigger dependent common info subfield is 0 or 1, all the STAs obtain the number of HE-LTFs indicated by B23 to B25 in the common info field. For another example, if the value of the trigger dependent common info subfield is 2 or 3, each STA obtains the number of HE-LTFs from the SS allocation subfield of the user-info field of the STA. Specifically, the number of HE-LTFs is obtained from the number of spatial streams in the SS allocation subfield of the user-info field.

Figure 10:
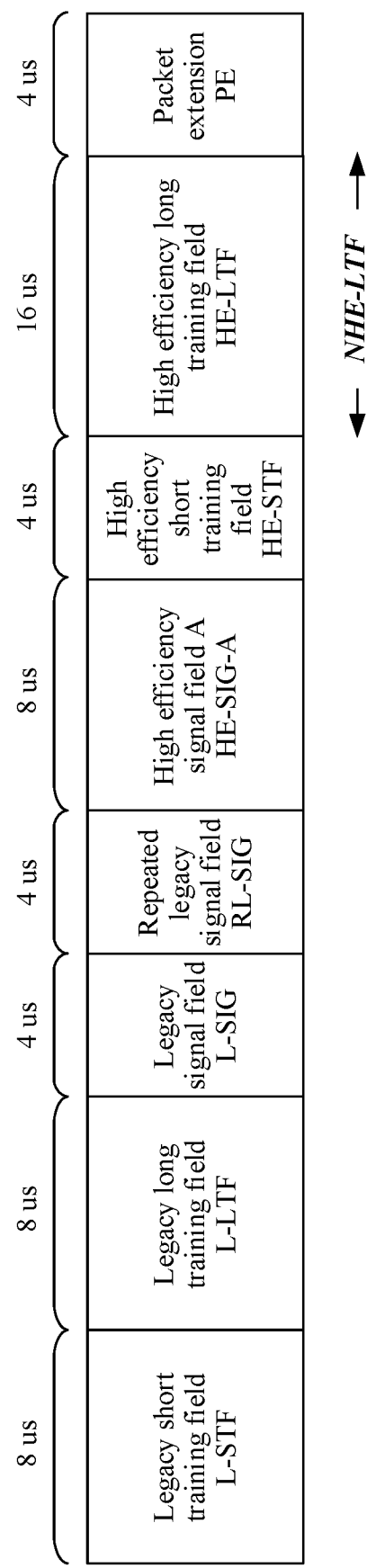
FIG. 10 is an example of an NDP frame according to this application.

After obtaining the number of HE-LTFs, the STAs may construct the NDP frames based on the number of HE-LTFs. FIG. 10 shows an example of an NDP frame, namely, an HE NDP PPDU frame (refer to the 802.11ax D3.2 FIG. 28-12).

A method for calculating duration of the NDP frame is as follows:

$$T_{NDP} = T_{L\text{-}STF} T_{L\text{-}LTF} T_{L\text{-}SIG} + T_{R\text{-}SIG} + T_{HE\text{-}SIG\text{-}A} + T_{HE\text{-}STF} + N_{HE\text{-}LTF} T_{HE\text{-}LTF} T_{PE} \quad (1\text{-}1)$$

Based on a format of the frame shown in FIG. 10, it may be further obtained that:

$$T_{NDP} = 40 + 16 * N_{HE\text{-}LTF} \quad (1\text{-}2)$$

Further, a STA whose sequence of sending the NDP frame is n (a value of n is 1, 2, ..., and N) (referred to as the $n^{th}$ STA) may obtain, through calculation, a delay required for the STA to send the NDP frame. The delay is as follows:

$$T_{Delay} = SIFS * n + \Sigma_{i=1}^{n-1}(40 + 16 * N_{Tx,User_i}) \quad (1\text{-}3)$$

The short interframe space SIFS is 16 µs. With reference to step 508 in the embodiment in FIG. 5, each STA determines, based on the delay obtained through calculation, the time point for reporting the NDP frame, and then reports the NDP frame at the time point.

With reference to step 509 in the embodiment in FIG. 5, in an implementation, both the master AP and the slave APs may calculate, according to the formula (1-3), a time point at which a STA sends an NDP frame. Then, the master AP and the slave APs check, based on the time points at which the STAs receives the NDP frames, $T_{Delay}$ of which STA is close to the time point, determine that the NDP frame is an NDP frame of the STA, and then perform channel estimation based on the number of HE-LTFs carried in the NDP frame.

With reference to step 509 in the embodiment in FIG. 5, in another implementation, if the NDP frame includes reported sequence information, the master AP and the slave APs may obtain the sequence information from the NDP frame, obtain an association identifier (namely, an identifier of a STA) in a user info field corresponding to the sequence in the TSDS frame, and determine which STA reports the NDP frame.

With reference to step 509 in the embodiment in FIG. 5, in another implementation, if the NDP frame includes an identifier of a reported STA, the master AP and the slave APs may determine, based on the identifier of the STA, which STA reports the NDP frame.

Example 2: The New Trigger Frame is Designed

In Example 2, the trigger frame may also be referred to as a self-delay sounding (self-delay sounding, SDS) frame.

Figure 11:
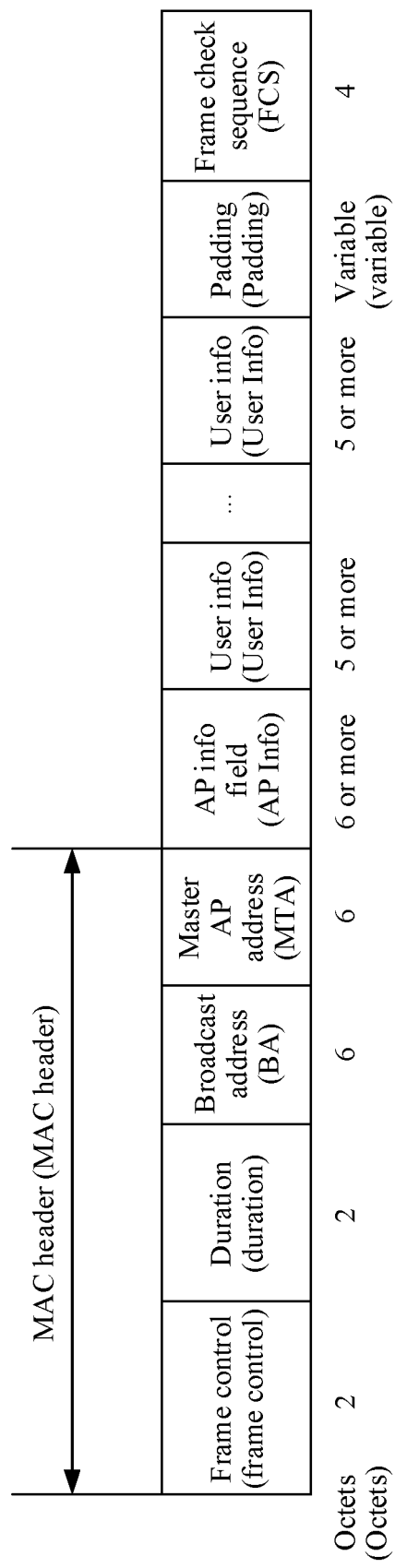
FIG. 11 is a frame format of an SDS frame according to this application.

FIG. 11 shows a frame format of an SDS frame according to this application. The SDS frame is a newly added frame type. The frame needs to include only a MAC header, an AP info (AP Info) field, and a user info (User Info) field. Other fields are not limited. The AP info field and the user info field may also be added to a control frame. The control frame is not specified.

The following describes fields of the SDS frame shown in FIG. 11.

A frame control field may be any field that is not used. The field is not specified.

A duration field indicates duration of a frame.

A BA field indicates a broadcast address, to be specific, the BA field indicates that the frame can be directed to all wireless devices that can receive the frame.

An MTA field indicates an address from which the SDS frame is sent, namely, a MAC address of the master AP in this embodiment.

An AP info field is an AP information field, mainly includes BSSIDs of slave APs, and is used to indicate a slave AP to participate in channel estimation.

A user info field is a user information field and mainly includes AIDs of STAs, the number of HE-LTFs included in uplink NDP frames sent by the STAs, and a time sequence for reporting the NDP frames.

Figure 12:
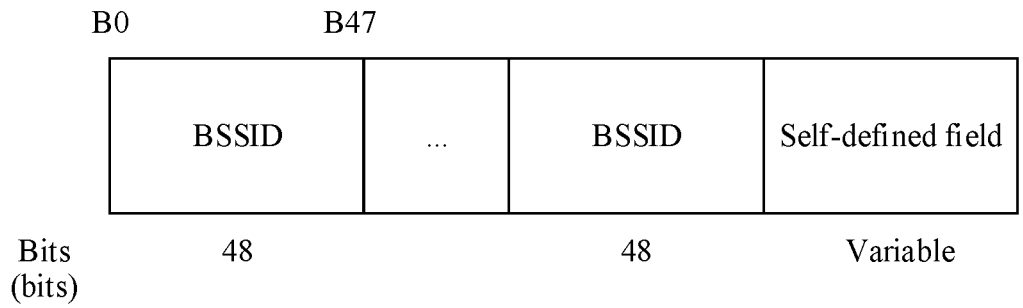
FIG. 12 is a format of an AP info field in an SDS frame according to this application.

FIG. 12 shows a format of the AP info field in the SDS frame according to this application. The AP info field needs to include only the BSSIDs of the slave APs. A quantity of slave APs is the same as a quantity of BSSIDs. A user-defined subfield may be used for other functions, and is not limited herein.

Figure 13:
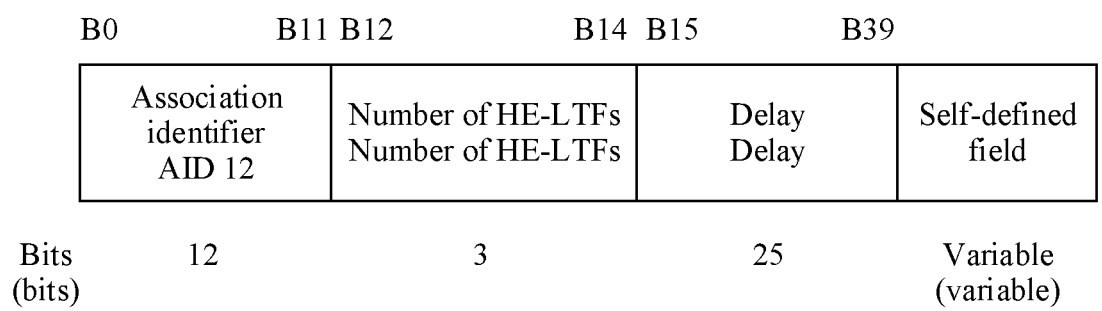
FIG. 13 is a format of a user info field in an SDS frame according to this application.

FIG. 13 shows a format of the user info field in the SDS frame according to this application. The user info field includes the following three subfields:

(a) A subfield of an association identifier of a STA. The field is used to identify the STA. The master AP assigns a value to B0 to B11 of each user info field based on determined user information (namely, the determined identifiers of the STAs).

(b) A subfield of the number of HE-LTFs. The master AP assigns a value to B12 to B14 of the corresponding user info field based on the determined number of HE-LTFs required by each STA, where the value needs to be equal to "$N_{Tx,User_i} - 1$", namely, the quantity of antennas of the STAs minus one. See Table 2.3. This is consistent with the foregoing content.

(c) A subfield of reporting time points. The master AP calculates, based on the arranged sequence of the STAs and the number of HE-LTFs included in the NDP frames that need to be reported by the STAs, the time points at which the STAs need to report the NDP frames. The calculation method is shown in the formula (1-3) in Example 1.

The master AP converts the time points calculated by using the formulas (1-3) into binary values and assigns the binary values to B15 to B39 of the corresponding user info field.

It should be noted that a user-defined subfield is not limited herein, and the user-defined subfield may include any content. The user info field needs to include only the first three subfields.

With reference to step 506 in the embodiment in FIG. 5, the slave APs receive the trigger frame, namely, the SDS frame in this example, and check whether the BSSIDs in the AP info field include ID numbers of the slave APs, to determine whether the slave APs enter the channel estimation standby state. If the BSSIDs include the ID numbers, the slave APs enter the channel estimation standby state. If the BSSIDs do not include the ID numbers, the slave APs do not enter the channel estimation standby state.

It should be noted that the channel estimation standby state may be determined by using the AP info field of the SDS frame, or may be directly specified by the central controller.

After the slave APs obtain the AP info field, the slave APs obtain the user info field, and determine reporting time points of the STAs and reporting sequence of the STAs, to determine that which STA reports which NDP frame. There are two methods for determining the reporting time points: (1) The reporting time points of the corresponding STAs are calculated based on the number of HE-LTFs of the STAs. This is the same as the calculation method of the master AP, as shown in formulas (1 to 3). (2) The delay subfield of the user info field is obtained, to obtain the reporting time points.

It should be noted that the slave APs obtain roles of the slave APs in two manners: (1) The SDS frame is received on an air interface, and an AP having a BSSID of the SDS frame is included in the AP info field of the frame. (2) A master/slave relationship is directly controlled by the central controller. In this case, the AP info field may be empty.

With reference to step 507 in the embodiment in FIG. 5, the STAs receive the SDS frame, obtain the value of the user info field, determine the number of HE-LTFs, and construct the NDP frames.

Figure 14:
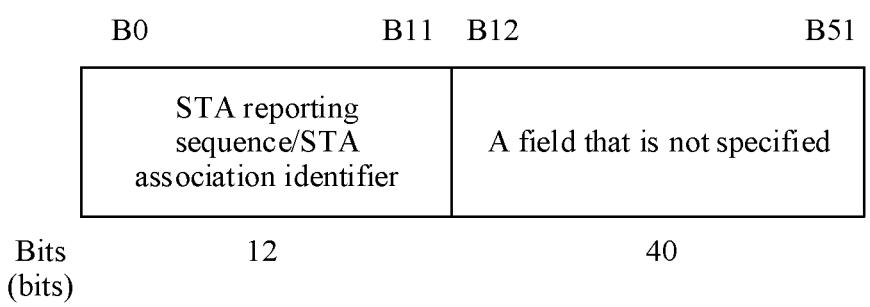
FIG. 14 is a format of an HE-SIG-A field of an NDP frame that is based on an SDS frame according to this application.

Optionally, after receiving the SDS frame, the STAs obtain sequences corresponding to the STAs in the user info field of the SDS frame, record the sequences, and add the sequences to HE-SIG-A fields of the NDP frames, or directly add the identifiers of the STAs, namely, the AIDs, to association identifier subfields of the HE-SIG-A fields. FIG. 14 is a format of an HE-SIG-A field of an NDP frame that is based on an SDS frame. The first field may be sequence information, or may be association identifier information. Different functions are provided according to different implementations, and all fields are 12 bits. Subsequent 40 bits are not limited, and may be added as required.

Then, the STAs have two methods to obtain the time points at which the STAs reports the constructed NDP frames: (1) Accumulated reporting time points are calculated based on the number of HE-LTFs of all the STAs in the user info field, and then obtain the reporting time points of the STAs. A calculation method is the same as that of the master AP, for example, the formulas (1 to 3). (2) The delay subfield of the user info field is obtained, to obtain the reporting time points. After obtaining the reporting time points, the STAs report the NDP frames according to step 508 in the embodiment in FIG. 5.

With reference to step 509 in the embodiment in FIG. 5, because time periods from times at which the STAs send the NDP frames to times at which the APs receive the NDP frames are generally less than 1 μs, the master AP and the slave APs may compare a time point at which an NDP frame of a STA is received with the time points at which the STAs report the NDP frames (which are calculated by using the trigger frame or directly obtained from the trigger frame), determine that the time point at which the NDP frame is received is close to a time point at which a STA reports an NDP frame, in other words, determine that the NDP frame is reported by a STA with the latest time point of sending an NDP frame, and then perform channel estimation based on the number of HE-LTFs carried in the NDP frame reported by the STA.

In another determining method, the master AP and the slave APs find, based on the STA reporting sequence/association identifier subfield in the HE-SIG-A fields in the NDP frames, the user info field of the corresponding SDS frame, determine which STA reports the NDP frame, and then perform channel estimation based on the number of HE-LTFs carried in the NDP frame reported by the STA.

Figure 15:
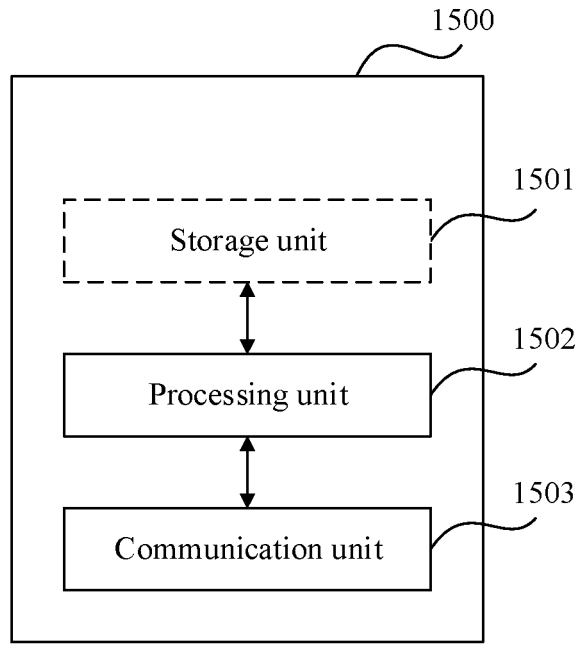
FIG. 15 is a schematic diagram of a training sequence transmission apparatus according to this application.

FIG. 15 is a possible example block diagram of a training sequence transmission apparatus 1500 according to this application. The apparatus 1500 may exist in a form of software or hardware. The apparatus 1500 may include a processing unit 1502 and a communication unit 1503. In an implementation, the communication unit 1503 may include a receiving unit and a sending unit. The processing unit 1502 is configured to control and manage an action of the apparatus 1500. The communication unit 1503 is configured to support communication between the apparatus 1500 and another network entity. The apparatus 1500 may further include a storage unit 1501, configured to store program code and data of the apparatus 1500.

The processing unit 1502 may be a processor or a controller, for example, a general-purpose central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The processing unit 1502 may implement or execute various example logical blocks, modules, and circuits described with reference to content disclosed in this application. The processor may alternatively be a combination of processors implementing a computing function, for example, a combination of one or more microprocessors, or a combination of the DSP and a microprocessor. The storage unit 1501 may be a memory. The communication unit 1503 is an interface circuit of the apparatus, and is configured to receive a signal from another apparatus. For example, when the apparatus is implemented in a form of a chip, the communication unit 1503 is an interface circuit used by the chip to receive a signal from another chip or apparatus, or is an interface circuit used by the chip to send a signal to another chip or apparatus.

The apparatus 1500 may be an AP (for example, a first AP or second AP) in any one of the foregoing embodiments, or may be a chip used for an AP. For example, when the apparatus 1500 is the AP, the processing unit 1502 may be, for example, a processor, and the communication unit 1503 may be, for example, a transceiver. Optionally, the transceiver may include a radio frequency circuit, and the storage unit may be, for example, a memory. For example, when the apparatus 1500 is the chip used for an AP, the processing unit 1502 may be, for example, a processor, and the communication unit 1503 may be, for example, an input/output interface, a pin, or a circuit. The processing unit 1502 may execute computer-executable instructions stored in the storage unit. Optionally, the storage unit is a storage unit inside the chip, for example, a register or a buffer. Alternatively, the storage unit may alternatively be a storage unit that is inside the AP and that is located outside the chip, for example, a read-only memory (read-only memory, ROM) or another type of static storage device that can store static information and instructions, or a random access memory (random access memory, RAM).

In an embodiment, the apparatus 1500 is the first AP in the foregoing embodiments, and the communication unit 1503 of the first AP includes a sending unit and a receiving unit. The sending unit is configured to broadcast a trigger frame, where the trigger frame indicates a time sequence of separately sending channel sounding frames by N stations STAs, and N is an integer greater than 1. The receiving unit is configured to receive the channel sounding frames sequentially sent by the N STAs, where one channel sounding frame includes one or more training sequences.

In a possible implementation, the sending unit is specifically configured to broadcast the trigger frame to the N STAs and M second APs, where the trigger frame further indicates whether the M second APs are ready to receive the channel sounding frames sequentially sent by the N STAs, and M is a positive integer.

In a possible implementation, the sending unit is further configured to: before broadcasting the trigger frame to the N STAs and the M second APs, separately send indication information to the M second APs, where the indication information is used to indicate to follow an indication of the trigger frame of the first AP.

In a possible implementation, the receiving unit is further configured to receive notification information from a central controller, where the notification information includes identification information of the N STAs, and the notification information is used to indicate to perform channel sounding on the N STAs.

In a possible implementation, the notification information further includes antenna capability information separately corresponding to the N STAs, and antenna capability information of one STA is used to determine a quantity of training sequences corresponding to the STA.

In a possible implementation, the processing unit 1502 is configured to determine to perform channel sounding on the N STAs.

In a possible implementation, the trigger frame includes a quantity of training sequences corresponding to each of the N STAs, and a quantity of training sequences included in the channel sounding frame is specified by the trigger frame.

In a possible implementation, a frame body of the trigger frame includes first information, and the first information is used to indicate information about the quantity of training sequences corresponding to each of the N STAs and information about occupied bits of the quantity of the training sequences corresponding to each of the N STAs.

In a possible implementation, the first information indicates that the N STAs correspond to a same quantity of training sequences and the quantity occupies a first bit; or the first information indicates that a quantity of training sequences corresponding to information about a first bit is ignored, the quantity of training sequences corresponding to each of the N STAs occupies a second bit, the second bit includes N sub-bits, and one sub-bit indicates a quantity of training sequences corresponding to one STA.

In a possible implementation, a quantity of training sequences included in the channel sounding frames is determined by the N STAs separately based on the antenna capability information of the N STAs.

In a possible implementation, the trigger frame includes time points at which the N STAs separately send the channel sounding frames.

In a possible implementation, the processing unit is further configured to: determine a second time point at which a first channel sounding frame is received, where the first channel sounding frame is any channel sounding frame in the channel sounding frames separately sent by the N STAs; determine a first time point closest to the second time point in the time points at which the N STAs separately send the channel sounding frames; and determine that a STA corresponding to the first time point is a STA that sends the first channel sounding frame.

In a possible implementation, the receiving unit is specifically to receive, based on the time sequence of separately sending the channel sounding frames by the N STAs, the channel sounding frames sequentially sent by the N STAs.

In a possible implementation, the processing unit 1502 is configured to determine, based on the time sequence of separately sending the channel sounding frames by the N STAs, the time points at which the N STAs send the channel sounding frames; for any channel sounding frame in the N channel sounding frames separately sent by the N STAs, determine a second time point at which the channel sounding frame is received, and determine a first time point closest to the second time point in the time points at which the N STAs separately send the channel sounding frames; determine that a STA corresponding to the first time point is a STA corresponding to the channel sounding frame; and obtain a quantity of training sequences from the STA corresponding to the channel sounding frame, and use the quantity as a quantity of training sequences corresponding to the STA.

In a possible implementation, the channel sounding frames separately sent by the N STAs separately include sequence information, and the sequence information indicates a sending sequence of one channel sounding frame in the N channel sounding frames sent by the N STAs. The processing unit 1502 is specifically configured to: for any channel sounding frame in the N channel sounding frames separately sent by the N STAs, determine, based on sequence information of the channel sounding frame and the time sequence of separately sending the channel sounding frames by the N STAs, STA information corresponding to the sequence information in the trigger frame; determine that a STA indicated by the STA information is a STA corresponding to the channel sounding frame; and obtain a quantity of training sequences from the STA corresponding to the channel sounding frame, and use the quantity as a quantity of training sequences corresponding to the STA.

In another embodiment, the apparatus 1500 is the second AP in the foregoing embodiments, and the communication unit 1503 of the second AP includes a sending unit and a receiving unit. The receiving unit is configured to: receive a trigger frame broadcast by a first AP, where the trigger frame indicates a time sequence of separately sending channel sounding frames by N STAs, and N is an integer greater than 1; and receive the channel sounding frames sequentially sent by the N STAs, where one channel sounding frame includes one or more training sequences.

In a possible implementation, before receiving the trigger frame broadcast by the first AP, the receiving unit is further configured to receive indication information from a central controller or the first AP, where the indication information is used to indicate to follow an indication of the trigger frame of the first AP.

In a possible implementation, the trigger frame includes a quantity of training sequences corresponding to each of the N STAs, and a quantity of training sequences included in the channel sounding frame is specified by the trigger frame.

In a possible implementation, a frame body of the trigger frame includes first information, and the first information is used to indicate information about the quantity of training sequences corresponding to each of the N STAs and information about occupied bits of the quantity of the training sequences corresponding to each of the N STAs.

In a possible implementation, the first information indicates that the N STAs correspond to a same quantity of training sequences and the quantity occupies a first bit; or the first information indicates that a quantity of training sequences corresponding to information about a first bit is ignored, the quantity of training sequences corresponding to each of the N STAs occupies a second bit, the second bit includes N sub-bits, and one sub-bit indicates a quantity of training sequences corresponding to one STA.

In a possible implementation, a quantity of training sequences included in the channel sounding frames is determined by the N STAs separately based on antenna capability information of the N STAs.

In a possible implementation, the trigger frame is further used to indicate that the second AP are ready to receive the channel sounding frames sequentially sent by the N STAs.

In a possible implementation, the trigger frame includes identifier of the second AP. The processing unit 1502 is configured to: if the trigger frame includes the identifier of the second AP, determine to receive the channel sounding frames sequentially sent by the N STAs.

In a possible implementation, the trigger frame further includes time points at which the N STAs separately send the channel sounding frames.

In a possible implementation, the processing unit 1502 is further configured to: determine a second time point at which a first channel sounding frame is received, where the first channel sounding frame is any channel sounding frame in the channel sounding frames separately sent by the N STAs; determine a first time point closest to the second time point in the time points at which the N STAs separately send the channel sounding frames; and determine that a STA corresponding to the first time point is a STA that sends the first channel sounding frame.

In a possible implementation, the receiving unit is specifically to receive, based on the time sequence of separately sending the channel sounding frames by the N STAs, the channel sounding frames sequentially sent by the N STAs.

In a possible implementation, the processing unit 1502 is configured to: determine, based on the time sequence of separately sending the channel sounding frames by the N STAs, the time points at which the N STAs separately send the channel sounding frames; for any channel sounding frame in the N channel sounding frames separately sent by the N STAs, determine a second time point at which the channel sounding frame is received, and determine a first time point closest to the second time point in the time points at which the N STAs separately send the channel sounding frames; determine that a STA corresponding to the first time point is a STA corresponding to the channel sounding frame; and obtain a quantity of training sequences from the STA corresponding to the channel sounding frame, and use the quantity as a quantity of training sequences corresponding to the STA.

In a possible implementation, the channel sounding frames separately sent by the N STAs separately include sequence information, and the sequence information indicates a sending sequence of one channel sounding frame in the N channel sounding frames sent by the N STAs. The processing unit 1502 is specifically configured to: for any channel sounding frame in the N channel sounding frames separately sent by the N STAs, determine, based on sequence information of the channel sounding frame and the time sequence of separately sending the channel sounding frames by the N STAs, STA information corresponding to the sequence information in the trigger frame; determine that a STA indicated by the STA information is a STA corresponding to the channel sounding frame; and obtain a quantity of training sequences from the STA corresponding to the channel sounding frame, and use the quantity as a quantity of training sequences corresponding to the STA.

It may be understood that, for a specific implementation process and corresponding beneficial effects when the apparatus 1500 is used in the foregoing training sequence transmission method, refer to related descriptions in the foregoing method embodiments. Details are not described herein again.

Figure 16:
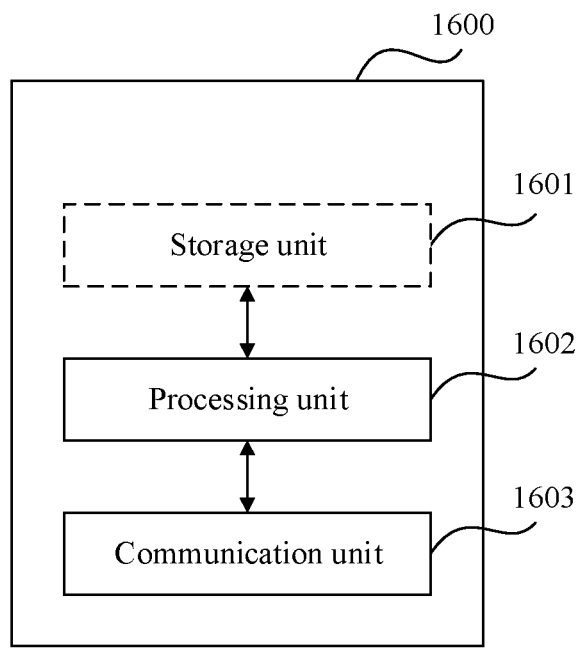
FIG. 16 is a schematic diagram of another training sequence transmission apparatus according to this application.

FIG. 16 is a possible example block diagram of a training sequence transmission apparatus 1600 according to this application. The training sequence transmission apparatus 1600 may exist in a form of software or hardware. The apparatus 1600 may include a processing unit 1602 and a communication unit 1603. In an implementation, the communication unit 1603 may include a receiving unit and a sending unit. The processing unit 1602 is configured to control and manage an action of the apparatus 1600. The communication unit 1603 is configured to support communication between the apparatus 1600 and another network entity. The apparatus 1600 may further include a storage unit 1601, configured to store program code and data of the apparatus 1600.

The processing unit 1602 may be a processor or a controller, for example, a CPU, a general-purpose processor, a DSP, an ASIC, an FPGA or another programmable logic device, a transistor logic device, a hardware component, or any combination thereof. The processing unit 1602 may implement or execute various example logical blocks, modules, and circuits described with reference to content disclosed in this application. The processor may alternatively be a combination of processors implementing a computing function, for example, a combination of one or more microprocessors, or a combination of the DSP and a microprocessor. The storage unit 1601 may be a memory. The communication unit 1603 is an interface circuit of the apparatus, and is configured to receive a signal from another apparatus. For example, when the apparatus is implemented in a form of a chip, the communication unit 1603 is an interface circuit used by the chip to receive a signal from another chip or apparatus, or is an interface circuit used by the chip to send a signal to another chip or apparatus.

The apparatus 1600 may be a STA in any one of the foregoing embodiments, or may be a chip used for a STA. For example, when the apparatus 1600 is the STA, the processing unit 1602 may be, for example, a processor, and the communication unit 1603 may be, for example, a transceiver. Optionally, the transceiver may include a radio frequency circuit, and the storage unit may be, for example, a memory. For example, when the apparatus 1600 is the chip used for a STA, the processing unit 1602 may be, for example, a processor, and the communication unit 1603 may be, for example, an input/output interface, a pin, or a circuit. The processing unit 1602 may execute computer-executable instructions stored in the storage unit. Optionally, the storage unit is a storage unit in the chip, for example, a register or a cache; or the storage unit may be a storage unit that is inside the STA and that is located outside the chip, for example, a ROM or another type of static storage device that can store static information and instructions, or a RAM.

In an embodiment, the apparatus 1600 is the first STA in the foregoing embodiments, and the communication unit 1603 of the first STA includes a sending unit and a receiving unit. The receiving unit is configured to receive a trigger frame broadcast by a first AP, where the trigger frame indicates a time sequence of separately sending channel sounding frames by N STAs, the N STAs include the first STA, and N is an integer greater than 1. The processing unit is configured to: construct a first channel sounding frame based on a quantity of training sequences corresponding to the first STA, where the first channel sounding frame includes one or more training sequences; and determine a first time point for sending the first channel sounding frame. The sending unit is configured to send the first channel sounding frame at the first time point.

In a possible implementation, the processing unit is specifically configured to: determine a second STA based on the time sequence of separately sending the channel sounding frames by the N STAs, where a time sequence of sending a channel sounding frame by the second STA is earlier than a time sequence of sending a channel sounding frame by the first STA; determine, based on duration in which the second STA sends the channel sounding frame, the first for sending the first channel sounding frame.

In a possible implementation, the processing unit is further configured to determine, based on a quantity of training sequences corresponding to the second STA, the duration in which the second STA sends the channel sounding frame.

In a possible implementation, the trigger frame includes time points at which the N STAs separately send the channel sounding frames. The processing unit is specifically configured to obtain the first time point for sending the first channel sounding frame from the trigger frame.

In a possible implementation, the trigger frame includes a quantity of training sequences corresponding to each of the N STAs. The first STA obtains the quantity of training sequences corresponding to the first STA from the trigger frame.

In a possible implementation, a frame body of the trigger frame includes first information, and the first information is used to indicate information about the quantity of training sequences corresponding to each of the N STAs and information about occupied bits of the quantity of the training sequences corresponding to each of the N STAs.

In a possible implementation, the first information indicates that the N STAs correspond to a same quantity of training sequences and the quantity occupies a first bit; or the first information indicates that a quantity of training sequences corresponding to information about a first bit is ignored, the quantity of training sequences corresponding to each of the N STAs occupies a second bit, the second bit includes N sub-bits, and one sub-bit indicates a quantity of training sequences corresponding to one STA.

In a possible implementation, the processing unit is further configured to determine, based on antenna capability information of the first STA, the quantity of training sequences corresponding to the first STA.

It may be understood that for a specific implementation process and corresponding beneficial effects when the apparatus 1600 is used in the foregoing training sequence transmission method, refer to related descriptions in the foregoing method embodiments. Details are not described herein again.

Figure 17:
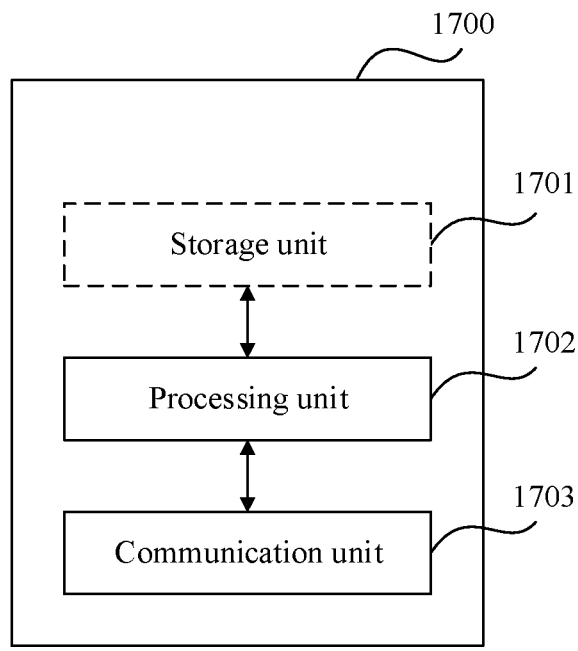
FIG. 17 is a schematic diagram of still another training sequence transmission apparatus according to this application.

FIG. 17 is a possible example block diagram of a training sequence transmission apparatus 1700 according to this application. The training sequence transmission apparatus 1700 may exist in a form of software or hardware. The apparatus 1700 may include a processing unit 1702 and a communication unit 1703. In an implementation, the communication unit 1703 may include a receiving unit and a sending unit. The processing unit 1702 is configured to control and manage an action of the apparatus 1700. The communication unit 1703 is configured to support communication between the apparatus 1700 and another network entity. The apparatus 1700 may further include a storage unit 1701, configured to store program code and data of the apparatus 1700.

The processing unit 1702 may be a processor or a controller, for example, a CPU, a general-purpose processor, a DSP, an ASIC, an FPGA or another programmable logic device, a transistor logic device, a hardware component, or any combination thereof. The processing unit 1702 may implement or execute various example logical blocks, modules, and circuits described with reference to content disclosed in this application. The processor may alternatively be a combination of processors implementing a computing function, for example, a combination of one or more microprocessors, or a combination of the DSP and a microprocessor. The storage unit 1701 may be a memory. The communication unit 1703 is an interface circuit of the apparatus, and is configured to receive a signal from another apparatus. For example, when the apparatus is implemented in a form of a chip, the communication unit 1703 is an interface circuit used by the chip to receive a signal from another chip or apparatus, or is an interface circuit used by the chip to send a signal to another chip or apparatus.

The apparatus 1700 may be a central controller in any one of the foregoing embodiments, or may be a chip used for a central controller. For example, when the apparatus 1700 is the central controller, the processing unit 1702 may be, for example, a processor, and the communication unit 1703 may be, for example, a transceiver. Optionally, the transceiver may include a radio frequency circuit, and the storage unit may be, for example, a memory. For example, when the apparatus 1700 is the chip used for a central controller, the processing unit 1702 may be, for example, a processor, and the communication unit 1703 may be, for example, an input/output interface, a pin, or a circuit. The processing unit 1702 may execute computer-executable instructions stored in the storage unit. Optionally, the storage unit is a storage unit in the chip, for example, a register or a cache; or the storage unit may be a storage unit that is in the central controller and that is outside the chip, for example, a ROM or another type of static storage device that can store static information and instructions, or a RAM.

In an embodiment, the apparatus 1700 is the central controller, and the communication unit 1703 of the central controller includes a sending unit and a receiving unit. The processing unit 1702 is configured to determine N STAs on which channel sounding needs to be performed, where N is an integer greater than 1. The sending unit is configured to send notification information to a first AP, where the notification information includes identification information of the N STAs, and the notification information is used to indicate to perform channel sounding on the N STAs.

In a possible implementation, the notification information further includes antenna capability information separately corresponding to the N STAs, and antenna capability information of one STA is used to determine a quantity of training sequences corresponding to the STA.

In a possible implementation, the processing unit is further configured to determine the first AP.

In a possible implementation, the sending unit is further configured to separately send indication information to M second APs, where the indication information is used to indicate to follow an indication of a trigger frame of the first AP.

In a possible implementation, the processing unit is further configured to determine the M second APs.

In a possible implementation, the receiving unit is configured to receive the identification information of the N STAs.

In a possible implementation, the receiving unit is further configured to receive the antenna capability information separately corresponding to the N STAs.

It may be understood that for a specific implementation process and corresponding beneficial effects when the apparatus 1700 is used in the foregoing training sequence transmission method, refer to related descriptions in the foregoing method embodiments. Details are not described herein again.

Figure 18:
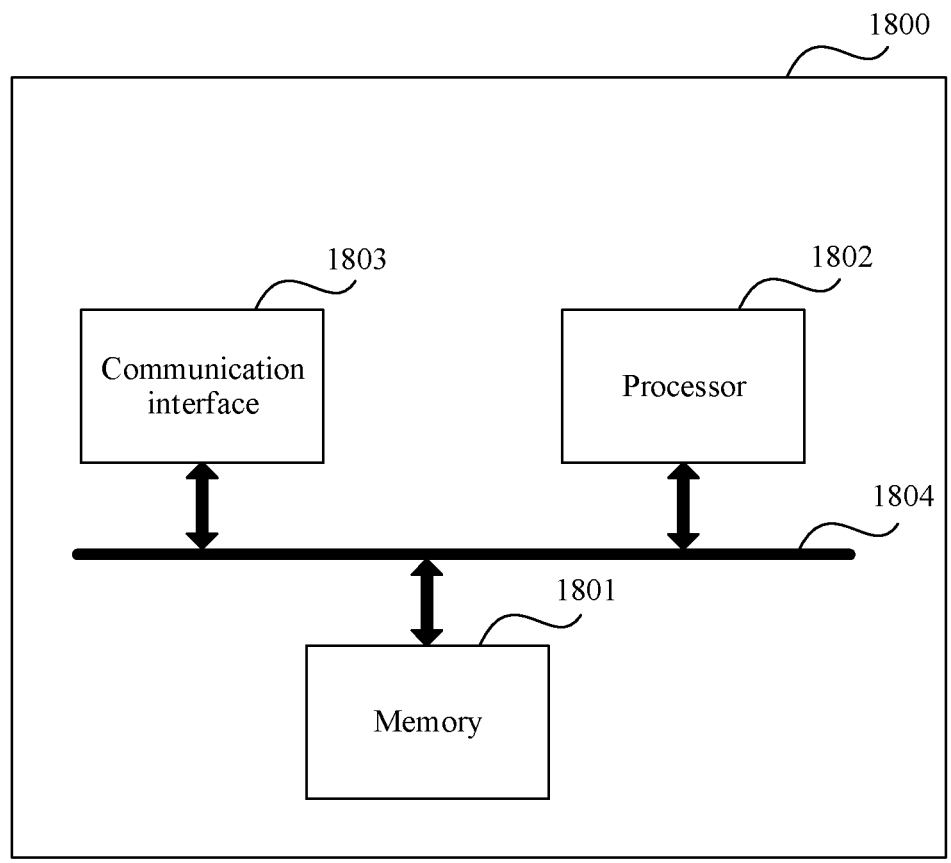
FIG. 18 is a schematic diagram of yet another training sequence transmission apparatus according to this application.

FIG. 18 is a schematic diagram of a training sequence transmission apparatus 1800 according to this application. The training sequence transmission apparatus 1800 may be the foregoing STA (for example, the first STA), the AP (for example, the first AP or the second AP), or the central controller. The apparatus 1800 includes a processor 1802, a communication interface 1803, and a memory 1801. Optionally, the apparatus 1800 may further include a communication line 1804. The communication interface 1803, the processor 1802, and the memory 1801 may be connected to each other through the communication line 1804. The communication line 1804 may be a peripheral component interconnect (peripheral component interconnect, PCI for short) bus, an extended industry standard architecture (extended industry standard architecture, EISA for short) bus, or the like. The communication line 1804 may be classified into an address bus, a data bus, a control bus, and the like. For ease of representation, only one thick line is used to represent the bus in FIG. 18, but this does not mean that there is only one bus or only one type of bus.

The processor 1802 may be a CPU, a microprocessor, an ASIC, or one or more integrated circuits configured to control program execution in the solutions of this application.

The communication interface 1803 uses any transceiver-type apparatus, to communicate with another device or a communication network, for example, the Ethernet, a radio access network (radio access network, RAN), a wireless local area network (wireless local area network, WLAN), or a wired access network.

The memory 1801 may be a ROM or another type of static storage device that can store static information and instructions, or a RAM or another type of dynamic storage device that can store information and instructions; or may be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer, but is not limited thereto. The memory may exist independently, and is connected to the processor through the communication line 1804. The memory may alternatively be integrated with the processor.

The memory 1801 is configured to store computer-executable instructions for executing the solutions of this application, and execution is controlled by the processor 1802. The processor 1802 is configured to execute the computer-executable instructions stored in the memory 1801, to implement the training sequence transmission method provided in the foregoing embodiments of this application.

Optionally, the computer-executable instructions in this embodiment of this application may also be referred to as application program code. This is not specifically limited in this embodiment of this application.

A person of ordinary skill in the art may understand that various reference numerals such as "first" and "second" in this application are merely used for differentiation for ease of description, and are not used to limit the scope of the embodiments of this application, or represent a sequence. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. The term "at least one" means one or more. The term "at least two" means two or more. The term "at least one", "any one", or a similar expression thereof means any combination of these items, including a single item (piece) or any combination of a plurality of items (pieces). For example, at least one (piece, or type) of a, b, or c may represent: a, b, c, a and b, a and c, b and c, or a, b, and c, where a, b, and c may be singular or plural. The term "a plurality of" means two or more, and another quantifier is similar to this. In addition, an element (element) that appears in singular forms "a", "an", and "the" does not mean "one or only one" unless otherwise specified in the context, but means "one or more". For example, "a device" means one or more such devices.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer program instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer program instructions may be stored in a computer-readable storage medium or may be transmitted from a computer-readable storage medium to another computer-readable storage medium. For example, the computer program instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (Solid State Disk, SSD)), or the like.

The various illustrative logical units and circuits described in the embodiments of this application may implement or operate the described functions through a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in the embodiments of this application may be directly embedded into hardware, a software unit executed by a processor, or a combination thereof. The software unit may be stored in a RAM, a flash memory, a ROM, an EPROM, an EEPROM, a register, a hard disk, a removable magnetic disk, a CD-ROM, or a storage medium of any other form in the art. For example, the storage medium may be connected to the processor, so that the processor can read information from the storage medium and write information into the storage medium. Optionally, the storage medium may alternatively be integrated into the processor. The processor and the storage medium may be disposed in an ASIC.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specified function in one or more processes in the flowcharts and/or in one or more blocks in the block diagrams.

Although this application is described with reference to specific features and the embodiments thereof, it is clear that various modifications and combinations may be made to them without departing from the spirit and scope of this application. Correspondingly, the specification and accompanying drawings are merely descriptions of examples of this application defined by the appended claims, and are considered as any of or all modifications, variations, combinations, or equivalents that cover the scope of this application. It is clear that a person skilled in the art can make various modifications and variations to this application without departing from the scope of this application. This application is intended to cover these modifications and variations of this application provided that these modifications and variations fall within the scope of the claims of this application and equivalent technologies of these modifications and variations.

What is claimed is:

1. A training sequence transmission method, comprising:
    receiving, by a first station (STA), a trigger frame broadcast by a first access point (AP), wherein the trigger frame indicates a time sequence of separately sending channel sounding frames by N STAs, the N STAs comprise the first STA, and N is an integer greater than 1, and wherein the trigger frame further indicates whether M second AP, which also receive the trigger frame, are ready to receive the channel sounding frame sequentially sent by the N STAs, and M is positive integer;
    constructing, by the first STA, a first channel sounding frame based on a quantity of training sequences corresponding to the first STA, wherein the first channel sounding frame comprises one or more training sequences;
    determining, by the first STA, a first time point for sending the first channel sounding frame based on the time sequence; and
    sending, by the first STA, the first channel sounding frame at the first time point.

2. The method according to claim 1, wherein the determining, by the first STA, the first time point for sending the first channel sounding frame comprises:
    determining, by the first STA, a second STA based on the time sequence of separately sending the channel sounding frames by the N STAs, wherein a time of sending a second channel sounding frame by the second STA precedes a time of sending a first channel sounding frame by the first STA; and
    determining, by the first STA based on a duration in which the second STA sends the second channel sounding frame, the first time point for sending the first channel sounding frame.

3. The method according to claim 2, further comprising:
    determining, by the first STA based on a quantity of training sequences corresponding to the second STA, the duration of time in which the second STA sends the second channel sounding frame.

4. The method according to claim 1, wherein the trigger frame comprises time points at which the N STAs separately send the channel sounding frames; and
    the determining, by the first STA, a first time point for sending the first channel sounding frame comprises:
    obtaining, by the first STA, the first time point for sending the first channel sounding frame from the trigger frame.

5. The method according to claim 1, wherein the trigger frame comprises a quantity of training sequences corresponding to each of the N STAs; and the method further comprises:
    obtaining, by the first STA, the quantity of training sequences corresponding to the first STA from the trigger frame.

6. A training sequence transmission method, comprising:
    broadcasting, by a first access point (AP), a trigger frame to N stations (STAs) and M second AP, wherein the trigger frame indicates a time sequence of separately sending channel sounding frames by N stations (STAs), and N is an integer greater than 1, and wherein the trigger frame further indicates whether M second AP are ready to receive the channel sounding frames sequentially sent by the N STAs and M is a positive integer; and
    receiving, by the first AP, the channel sounding frames sequentially sent by the N STAs, wherein one channel sounding frame comprises one or more training sequences.

7. The method according to claim 6, wherein before the broadcasting, by the first AP, the trigger frame to the N STAs and M second AP, the method further comprises:
    separately sending, by the first AP, indication information to the M second AP, wherein the indication information is used to indicate to follow an indication of the trigger frame of the first AP.

8. A training sequence transmission method, comprising:
    receiving, by a second access point (AP), a trigger frame broadcast by a first AP, wherein the trigger frame indicates a time sequence of separately sending channel sounding frames by N stations (STAs), and N is an integer greater than 1, and wherein the trigger frame further indicates whether M second AP, which receive the trigger frame, are ready to receive the channel sounding frame sequentially sent by the N STAs, the M second AP include the second AP, and M is a positive integer; and receiving, by the second AP, the channel sounding frames sequentially sent by the N STAs, wherein one channel sounding frame comprises one or more training sequences.

9. The method according to claim 8, wherein before the receiving, by second AP, a trigger frame broadcast by a first AP, the method further comprises:
receiving, by the second AP, indication information from a central controller or the first AP, wherein the indication information is used to indicate to follow an indication of the trigger frame of the first AP.

10. The method according to claim 8, wherein the trigger frame comprises a quantity of training sequences corresponding to each of the N STAs, and a quantity of training sequences comprised in the channel sounding frame is specified by the trigger frame.

11. The method according to claim 8, wherein the trigger frame comprises an identifier of the second AP, and the trigger frame is further used to indicate that the second AP should be ready to receive the channel sounding frames sequentially sent by the N STAs; and
the method further comprises:
determining, by the second AP, that the trigger frame comprises the identifier of the second AP; and
in response, determining, by the second AP, to receive the channel sounding frames sequentially sent by the N STAs.

12. The method according to claim 8, wherein the trigger frame further comprises time points at which the N STAs separately send the channel sounding frames.

13. The method according to claim 8, wherein the receiving, by the second AP, the channel sounding frames sequentially sent by the N STAs comprises:
receiving, by the second AP based on the time sequence of separately sending the channel sounding frames by the N STAs, the channel sounding frames sequentially sent by the N STAs.

14. The method according to claim 13, wherein the receiving, by the second AP based on the time sequence of separately sending the channel sounding frames by the N STAs, the channel sounding frames sequentially sent by the N STAs comprises:
determining, by the second AP based on the time sequence of separately sending the channel sounding frames by the N STAs, the time points at which the N STAs separately send the channel sounding frames; and
for any channel sounding frame in the N channel sounding frames separately sent by the N STAs, determining, by the second AP, a second time point at which the channel sounding frame is received, and determining a first time point closest to the second time point in the time points at which the N STAs separately send the channel sounding frames; determining that a STA corresponding to the first time point is a STA corresponding to the channel sounding frame; and obtaining a quantity of training sequences from the STA corresponding to the channel sounding frame, and using the quantity as a quantity of training sequences corresponding to the STA.

15. A training sequence transmission apparatus, wherein the training sequence transmission apparatus is used in a first station (STA) and comprises:
a receiving unit, configured to receive a trigger frame broadcast by a first access point (AP), wherein the trigger frame indicates a time sequence of separately sending channel sounding frames by N STAs, the N STAs comprise the first STA, and N is an integer greater than 1, and wherein the trigger frame further indicates whether M second AP, which also receive the trigger frame, are ready to receive the channel sounding frame sequentially sent by the N STAs, and M is a positive integer;
a processing unit, configured to: construct a first channel sounding frame based on a quantity of training sequences corresponding to the first STA, wherein the first channel sounding frame comprises one or more training sequences; and determine a first time point for sending the first channel sounding frame based on the time sequence; and
a sending unit, configured to send the first channel sounding frame at the first time point.

16. The apparatus according to claim 15, wherein the processing unit is further configured to:
determine a second STA based on the time sequence of separately sending the channel sounding frames by the N STAs, wherein a time of sending a second channel sounding frame by the second STA precedes a time of sending a first channel sounding frame by the first STA; and
determine, based on a duration in which the second STA sends the second channel sounding frame, the first time point for sending the first channel sounding frame.

17. The apparatus according to claim 16, wherein the processing unit is further configured to determine, based on a quantity of training sequences corresponding to the second STA, the duration of time in which the second STA sends the second channel sounding frame.

18. The apparatus according to claim 15, wherein the trigger frame comprises time points at which the N STAs separately send the channel sounding frames; and
the processing unit is further configured to obtain the first time point for sending the first channel sounding frame from the trigger frame.

19. The apparatus according to claim 15, wherein the trigger frame comprises a quantity of training sequences corresponding to each of the N STAs; and the processing unit is further configured to obtain the quantity of training sequences corresponding to the first STA from the trigger frame.

* * * * *